United States Patent
McConnell

(10) Patent No.: US 9,488,730 B2
(45) Date of Patent: Nov. 8, 2016

(54) RECEIVER ALIAS REJECTION IMPROVEMENT BY ADDING AN OFFSET

(71) Applicant: QUALCOMM Incorporated, San Diego, CA (US)

(72) Inventor: Richard Joseph McConnell, Rancho Cucamonga, CA (US)

(73) Assignee: QUALCOMM INCORPORATED, San Diego, CA (US)

( * ) Notice: Subject to any disclaimer, the term of this patent is extended or adjusted under 35 U.S.C. 154(b) by 656 days.

(21) Appl. No.: 13/943,679

(22) Filed: Jul. 16, 2013

(65) Prior Publication Data

US 2015/0022394 A1 Jan. 22, 2015

(51) Int. Cl.
- *G01S 19/13* (2010.01)
- *G01S 19/21* (2010.01)
- *G01S 19/24* (2010.01)
- *H04B 1/7097* (2011.01)

(52) U.S. Cl.
CPC ............. *G01S 19/13* (2013.01); *G01S 19/21* (2013.01); *G01S 19/24* (2013.01); *H04B 1/7097* (2013.01)

(58) Field of Classification Search
CPC ........ G01S 19/13; G01S 19/21; G01S 19/24; H04B 1/7097
See application file for complete search history.

(56) References Cited

U.S. PATENT DOCUMENTS

| | | | |
|---|---|---|---|
| 4,637,040 A * | 1/1987 | Sohval | A61B 6/032 378/10 |
| 6,879,817 B1 | 4/2005 | Sorrells et al. | |
| 8,140,043 B2 | 3/2012 | Suominen | |
| 8,280,314 B2 | 10/2012 | Heutmaker et al. | |
| 2003/0002617 A1 * | 1/2003 | Hsieh | A61B 6/032 378/19 |
| 2005/0157826 A1 | 7/2005 | Vaananen | |

(Continued)

FOREIGN PATENT DOCUMENTS

| | | |
|---|---|---|
| DE | 102006029482 A1 | 1/2008 |
| EP | 2116860 A2 | 11/2009 |

(Continued)

OTHER PUBLICATIONS

International Search Report and Written Opinion—PCT/US2014/046050—ISA/EPO—Oct. 13, 2014.

(Continued)

*Primary Examiner* — Harry Liu
(74) *Attorney, Agent, or Firm* — Kilpatrick Townsend & Stockton LLP

(57) ABSTRACT

Methods, systems, computer-readable media, and apparatuses for isolating a desired GNSS signal from a plurality of GNSS signals with the same code are presented. In some embodiments, a method may comprise receiving, by a mobile device, the plurality of GNSS signals, wherein the plurality of GNSS signals include the desired GNSS signal. Subsequently, the method may comprise processing the received plurality of GNSS signals to a down-converted signal, wherein the down-converted signal has a lower frequency than the desired GNSS signal, and wherein the down-converted signal includes a first channel associated with a non-zero frequency. Moreover, the method may comprise processing the down-converted signal to offset the first channel by an offset frequency corresponding to a fraction of the first channel to create an offset down-converted signal. Furthermore, the method may comprise determining the desired GNSS signal from the offset down-converted signal based on the offset frequency.

49 Claims, 16 Drawing Sheets

(56) References Cited

U.S. PATENT DOCUMENTS

| | | | | |
|---|---|---|---|---|
| 2007/0105495 | A1* | 5/2007 | Knight | G01S 19/32 |
| | | | | 455/12.1 |
| 2009/0160704 | A1 | 6/2009 | Zhao et al. | |
| 2009/0224973 | A1* | 9/2009 | Nayyar | G01S 19/29 |
| | | | | 342/357.42 |
| 2011/0164663 | A1 | 7/2011 | Safiri | |
| 2013/0021934 | A1* | 1/2013 | Rugamer | G01S 19/13 |
| | | | | 370/252 |

FOREIGN PATENT DOCUMENTS

| | | |
|---|---|---|
| WO | 2011090497 A1 | 7/2011 |
| WO | WO-2011090498 A1 | 7/2011 |

OTHER PUBLICATIONS

Abidi A.A., "Evolution of a Software-Defined Radio Receiver's RF Front-End," Radio Frequency Integrated Circuits (RFIC), Symposium, 2006 IEEE, IEEE, Piscataway, NJ, USA, Jun. 11, 2006, pp. 17-20.

Akos D.M., et al., "Direct Bandpass Sampling of Multiple Distinct RF Signals", IEEE Transactions on Communications, IEEE Service Center, Jul. 1, 1999, vol. 47 (7), pp. 983-988.

Rivela G., et al., "A Low Power RF Front-End for L1/E1 GPS/Galileo and GLONASS Signals in CMOS 65nm Technology," Localization and GNSS (ICL-GNSS), 2011, International Conference on, IEEE, Jun. 29, 2011, pp. 7-12.

* cited by examiner

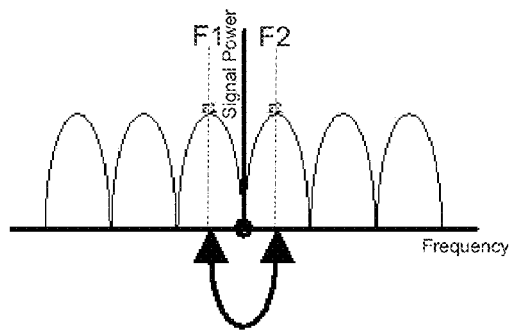
FIG. 4A – Without Offset
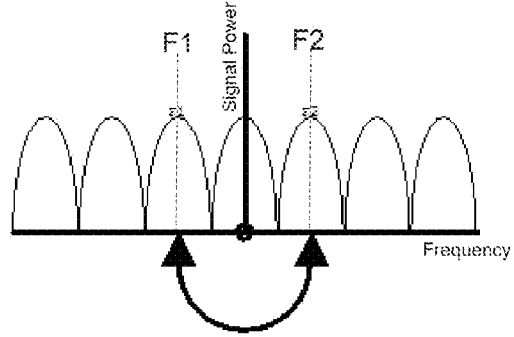
FIG. 4B – Without Offset
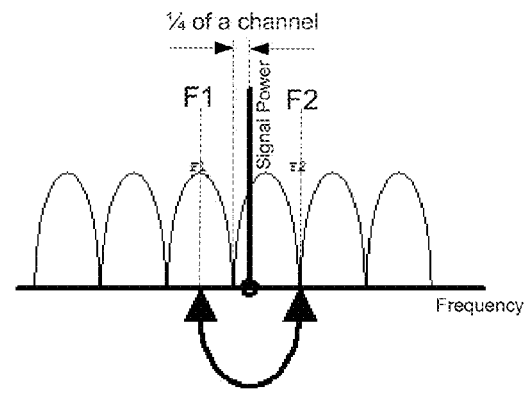
FIG. 4C – With ¼ of a Channel Offset
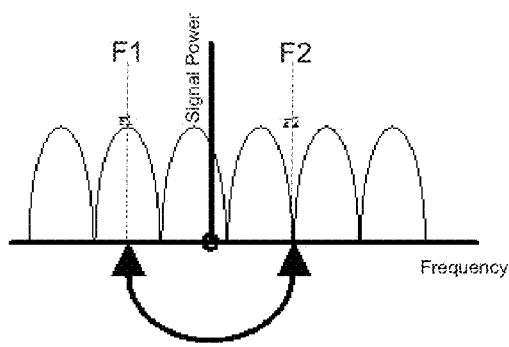
FIG. 4D – With Offset Alias of Channel -1 can fall ¼ of a channel from the center of Channel +1

RECEIVER ALIAS REJECTION IMPROVEMENT BY ADDING AN OFFSET

BACKGROUND

I. Field

The invention generally relates to receiver alias rejection on a mobile device. Aspects of the disclosure relate to methods for improving receiver alias rejection by adding an offset. Specifically, various techniques are provided for processing GNSS signals to improve alias rejection.

II. Background

Aliasing refers to an effect that causes different signals to become indistinguishable when sampled. The unwanted signal can be known as the aliased or imaged signal. Alias rejection refers to the method of rejecting the unwanted aliased or imaged signal. One method of alias rejection is code isolation. For example, current GPS receivers can use code isolation to discern between satellite channels in the positive and negative frequencies.

BRIEF SUMMARY

Certain embodiments are described that can improve a receiver alias rejection by adding an offset.

Methods, systems, computer-readable media, and apparatuses for isolating a desired GNSS signal from a plurality of GNSS signals with the same code are presented. In some embodiments, a method may comprise receiving, by a mobile device, the plurality of GNSS signals, wherein the plurality of GNSS signals include the desired GNSS signal. Subsequently, the method may comprise processing the received plurality of GNSS signals to a down-converted signal, wherein the down-converted signal has a lower frequency than the desired GNSS signal, and wherein the down-converted signal includes a first channel associated with a non-zero frequency. Moreover, the method may comprise processing the down-converted signal to offset the first channel by an offset frequency corresponding to a fraction of the first channel to create an offset down-converted signal. Furthermore, the method may comprise determining the desired GNSS signal from the offset down-converted signal based on the offset frequency.

For example, GLONASS can be an example of GNSS signals with a common code. In addition, the GNSS signals with a common code can be broadcast at different frequencies, where each signal is from different satellites. Furthermore, each satellite can be operating at a different frequency (e.g., each satellite's signal is at a different frequency).

In at least one arrangement, the determining may further comprise de-spreading the offset down-converted signal, wherein the offset down-converted signal includes an aliased signal associated with the first channel; and rejecting the aliased signal by filtering out the alias signal based on the offset frequency.

In at least one arrangement, the first channel is a positive frequency, and wherein the down-converted signal is centered at or near zero Hertz and the down-converted signal further includes a second channel associated with a negative frequency, and wherein the offsetting the first channel results in a center of the first channel being offset from a center of the second channel. Furthermore, the center of the aliased signal associated with the first channel and the center of a desired GNSS signal associated with the second channel are offset based on the offset frequency.

Alternatively, in at least one arrangement, the first channel is a negative frequency, and wherein the down-converted signal is centered at or near zero Hertz and the down-converted signal further includes a second channel associated with a positive frequency, and wherein the offset results in the center of the first channel being offset from the center of the second channel. Furthermore, the center of the aliased signal associated with the first channel and the center of a desired GNSS signal associated with the second channel are offset based on the offset frequency.

In at least one arrangement, the processing of the received GNSS signal to a down-converted signal is done in part by a local oscillator with a frequency equal to the desired signal.

In at least one arrangement, the processing of the down-converted signal to offset the first channel by the offset frequency is done in part by a digital signal processor or a general processor.

In at least one arrangement, the offset frequency is one-quarter of the first channel.

In at least one arrangement, the offset frequency is three-quarters of the first channel.

In at least one arrangement, wherein the offset frequency is one-eighth of the first channel.

Additionally, in at least one arrangement, where N is an integer and Channel_Spacing is a channel spacing associated with the first channel, and wherein the offset frequency is: Offset frequency=($\frac{1}{4}$+N*$\frac{1}{2}$)*Channel_Spacing.

Furthermore, in at least one arrangement, the offset frequency is a fractional offset of a multiple of a half channel associated with the first channel.

In another embodiment, a device for isolating a desired GNSS signal from a plurality of GNSS signals with the same code is disclosed. The device may comprise: memory; one or more radio frequency (RF) receivers; and one or more processors. The one or more RF receivers may: receive the plurality of GNSS signals, wherein the plurality of GNSS signals include the desired GNSS signal; and process the received plurality of GNSS signals to a down-converted signal, wherein the down-converted signal has a lower frequency than the desired GNSS signal, and wherein the down-converted signal includes a first channel associated with a non-zero frequency. The one or more processors may be configured to: process the down-converted signal to offset the first channel by an offset frequency corresponding to a fraction of the first channel to create an offset down-converted signal; and determine the desired GNSS signal from the offset down-converted signal based on the offset frequency.

In another embodiment, one or more non-transient computer-readable media may store computer-executable instructions, for isolating a desired GNSS signal from a plurality of GNSS signals with the same code, to: receive, by one or more RF modules, the plurality of GNSS signals, wherein the plurality of GNSS signals include the desired GNSS signal: process, by the one or more RF modules, the received plurality of GNSS signals to a down-converted signal, wherein the down-converted signal has a lower frequency than the desired GNSS signal, and wherein the down-converted signal includes a first channel associated with a non-zero frequency: process, by one or more processors, the down-converted signal to offset the first channel by an offset frequency corresponding to a fraction of the first channel to create an offset down-converted signal; and determine, by the one or more processors, the desired GNSS signal from the offset down-converted signal based on the offset frequency.

In another embodiment, an apparatus for isolating a desired GNSS signal from a plurality of GNSS signals with the same code, the apparatus may comprise: a means for receiving the plurality of GNSS signals, wherein the plurality of GNSS signals include the desired GNSS signal; means for processing the received plurality of GNSS signals to a down-converted signal, wherein the down-converted signal has a lower frequency than the desired GNSS signal, and wherein the down-converted signal includes a first channel associated with a non-zero frequency; a means for processing the down-converted signal to offset the first channel by an offset frequency corresponding to a fraction of the first channel to create an offset down-converted signal; and a means for determining the desired GNSS signal from the offset down-converted signal based on the offset frequency.

BRIEF DESCRIPTION OF THE DRAWINGS

Aspects of the disclosure are illustrated by way of example. In the accompanying figures, like reference numbers indicate similar elements, and:

FIGS. 4A-B illustrate implementations of alias rejection without an offset;

FIGS. 4C-D illustrate embodiments of alias rejection with an offset;

DETAILED DESCRIPTION

Several illustrative embodiments will now be described with respect to the accompanying drawings, which form a part hereof. While particular embodiments, in which one or more aspects of the disclosure may be implemented, are described below, other embodiments may be used and various modifications may be made without departing from the scope of the disclosure or the spirit of the appended claims.

GLONASS (GLO) is a GNSS (Global Navigation Satellite System) that complements and provides an alternative to the Global Positioning System (GPS). All GLONASS satellites transmit the same standard precision signal, but with each satellite transmitting on a different frequency. Unlike GPS satellites, GLO satellites have the same code division multiple access (CDMA) spreading code on all the satellite signals. The code chip rate is at 511 kHz and the code repeats every 511 chips. Each GLO satellites can have one channel and the code associated with each satellite is the same. The frequency for the channel associated to each satellite can be different.

As a result, the GLO codes for the positive and negative frequencies are the same. Thus, when the plus channel (e.g., positive frequencies) of a first GLO satellite falls on top of the negative channel (e.g., negative frequencies) of a second GLO satellite, methods of code isolation cannot help with alias rejection.

Primarily GNSS receivers distinguish signals and the alias signals apart by representing the signals in a quadrature form by generating in phase (I) and quadrature phase (Q) versions of the signal. The amount of alias rejection in this sort of system depends on the accuracy of the representations of the I and Q components and this may not be enough for the processing sections of the receiver to be able to reliably distinguish the signal and alias signals from each other. There are a number of other processing methods to distinguish signals from alias signals by looking at the signal data on them or by long-term tracking of the satellite. However, these processing methods are time-consuming and require high computing power. Therefore, improving the alias rejection can be a more efficient method to distinguish the signals.

Given that methods of code isolation cannot be used for alias rejection of a GLO signal, other methods for improving alias rejection must be used.

Figure 1:
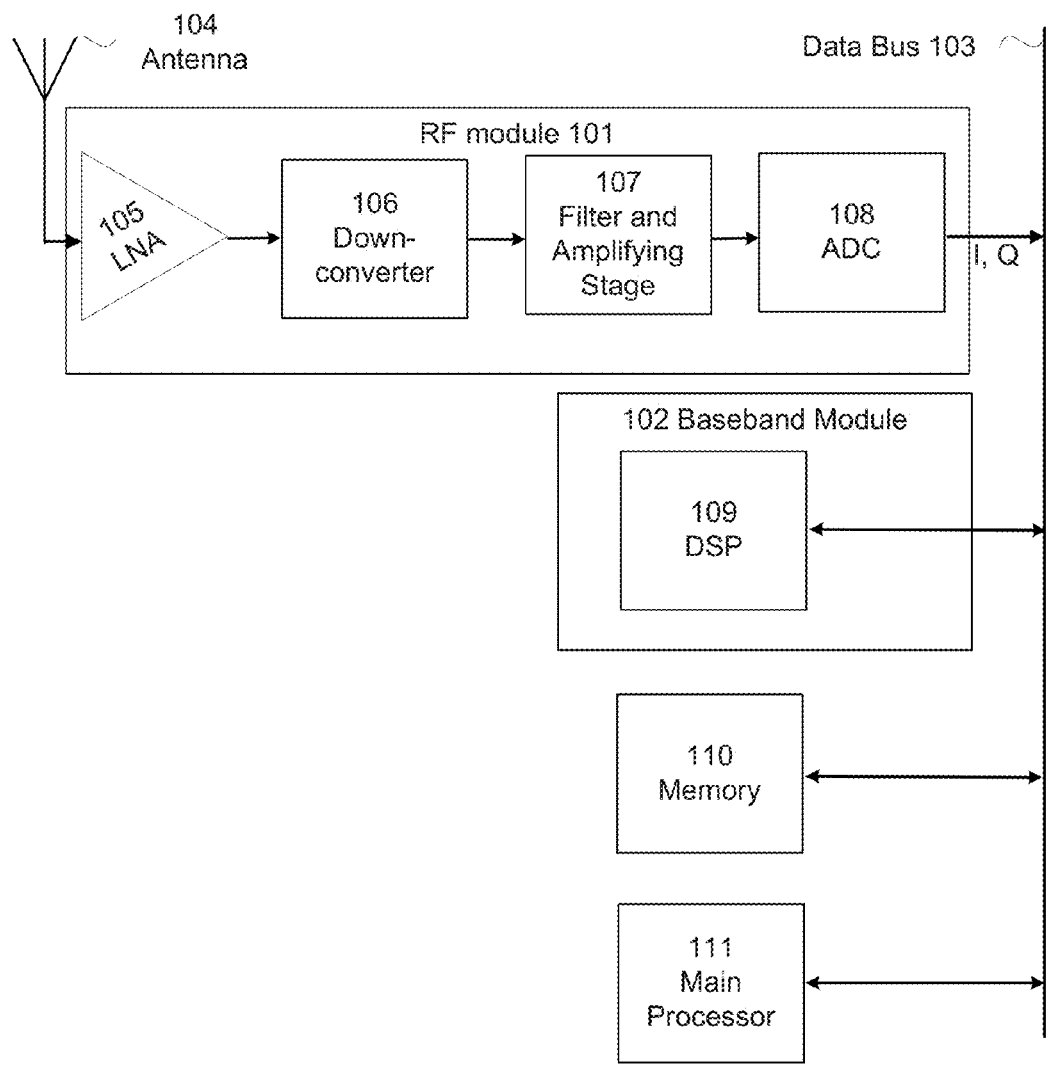
FIG. 1 illustrates an example of a GNSS (Global Navigation Satellite System) satellite receiver that may incorporate one or more embodiments.

FIG. 1 illustrates an example of a GNSS (Global Navigation Satellite System) receiver 100. The receiver comprises a GNSS (e.g., GLONASS) frequency (RF) module 101 (e.g., RF receiver, RF chip, RF front-end). The receiver 100 can receive signals from the various space vehicles from one or more GNSS using an external antenna 104.

Additionally, a low-noise amplifier (LNA) 105 can amplify the output signal from the external antenna 104. Subsequently, the signal from the LNA 105 can be down-converted to an intermediate frequency signal (IF signal) using a down-converter 106. The down-converted signal (e.g., IF signal) is then inputted to a filter and amplifying stage 107. The filter can limit the IF signal to only contains information we want to process. Additionally, the signal can be amplified in the filter and amplifying stage 107. Furthermore, all GNSS signals are modulated so they have no effective carrier; at most the carrier is equivalent to saying the center frequency of the RF signal. Moreover, the IF signal can include an in-phase (I) and a quadrature (Q) component, which are digitally converted by analog-to-digital converter (ADC) 108 into I/Q digital signals delivered over a data bus 103 to a baseband module 102 for further processing.

In one or more arrangement, RF module 101 and baseband module 102 can be incorporated in the same chip.

The baseband module 102 can include a general purpose processor and/or a digital signal processor (DSP) 109. According to some embodiments. DSP 109 can implement the offset and alias rejection as described in FIG. 5. In some instance baseband module can further include memory. For example, the baseband module 102 can include a general purpose processor, a DSP 109 and memory 110. The DSP 109 may run a program for performing the correlation and tracking procedure as well as navigation. Alternatively, the navigation can be performed on a separate program and/or processor. The RF module 101 and the baseband module 102 (e.g., DSP 109) can be connected over the data bus 103. In one embodiment, both modules can be designed in a single chip. For example, in most instances, a single chip can include RF module 101 and baseband module 102.

In some instances, a main processor 111 (e.g., an acquisition and navigation processor) can compute and display position related data. Furthermore, memory 110 can be connected over the data bus 103.

The baseband module 102 (e.g., DSP 109) can act as a de-spreader. The baseband module 102 can de-spread the I/Q signals delivered by the RF module 101 originating from the various GNSS Space Vehicles (SVs). As later illustrated in FIG. 7D, when the alias signal (e.g., plus channel of the GLO satellite) falls on top of the wanted signal (e.g., negative channel the same GLO satellite), it may be difficult to discern and reject the alias signal during the de-spreading process because the code for both signals are the same.

Additionally, the baseband module 102 (e.g., DSP 109) may correlate GNSS signals. For example, the baseband module 102 can temporally align the incoming signals with locally generated copies of the Pseudo Random Noise (PRN) signals of each existing or likely SV. This correlation may occur in the time domain using time-domain correlation techniques using parallel multiplication and summations or in the frequency domain. In order to reduce the computation overhead and the acquisition time, alignment is often performed in the frequency domain, by correlating a Fast Fourier Transform (FFT) transform of the incoming I/Q signals with FFT transforms of the PRN signals characterizing each SV.

Furthermore, the baseband module 102 can output digital processed data to a main processor 111 (e.g., an acquisition and navigation processor) using the data bus 103. The main processor 111 can compute and display position related data, including for example, pseudoranges and the position of the receiver.

A method for searching for satellite signals is described herein. For example, when searching for satellites in a CDMA system, the receiver 100 can select an area where satellite signals are expected to be received. Once received, the signal is multiplied by the code for the satellite using the baseband module 102, memory 110, and/or main processor 111. The multiplication outputs are integrated or summed up for an interval. At the end of the interval, the amount of energy (e.g., summed result) in each bin is checked in the accumulator using the baseband module 102, memory 110, and/or main processor 111. The energy (e.g., summed result) is stored, then the code is shifted by half a chip, and the process is repeated. In some instances, the storing is done in parallel, where the energy results for each code shift can be stored in a different bin. The method further includes searching through all the code positions and code variations. Additionally, the search window can be based on time and frequency. The result can be a table of energy data. Subsequently, the method includes searching through the table for the highest levels, where the highest levels can indicate the presence of satellite channels. Other embodiments may search through the bins in a search window in parallel.

The terms "auto correlation" described herein refer to aspects of searching for satellite signals. Auto-correlation can be regarded as correlation of a signal with its own code, where the code is not correctly positioned. Auto correlation can occur when the satellite code is not correctly aligned, but small peaks in the accumulated energy (e.g., summed result) are found. The small autocorrelation peaks can be less than the main correlation peak when the receiver code is lined up (e.g., correlated) with the signal code. For example, for GLO satellites the auto correlation peaks can be better than 18 dB below the correlated peak.

Figure 2:
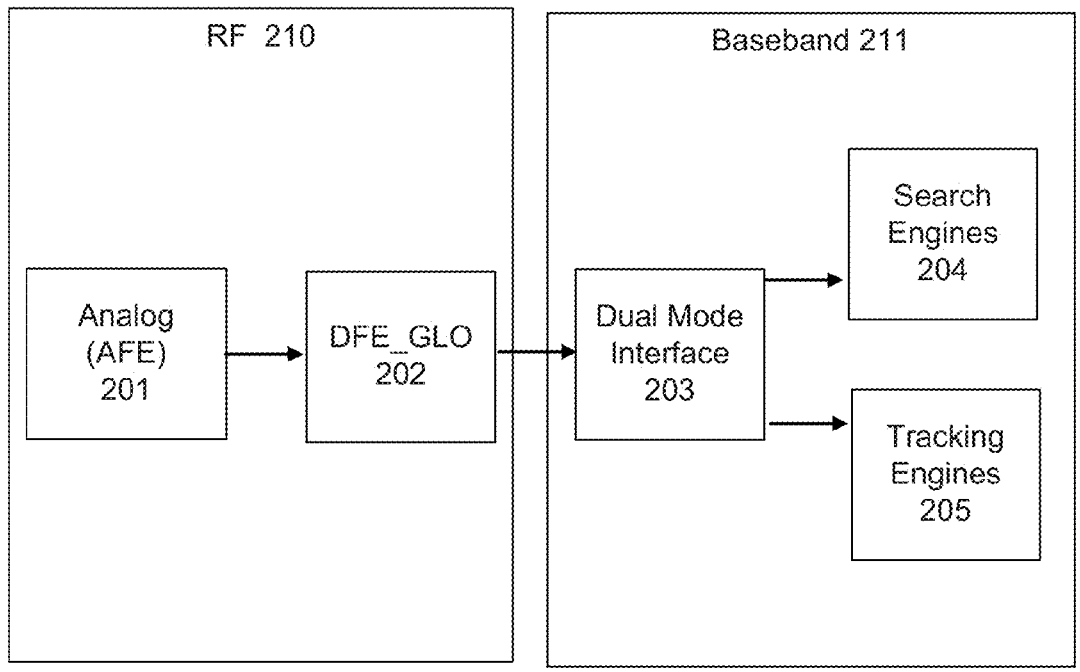
FIG. 2 illustrates an exemplary GNSS receiver for receiving and decoding signals for GNSS, according to an embodiment.

FIG. 2 illustrates an exemplary GLO receiver 200 for receiving and decoding signals for GNSS (e.g., GLONASS).

For example, GLONASS can be an example of GNSS signals with a common code. In addition, the GNSS signals with a common code can be broadcast at different frequencies, where each signal is from different satellites. Furthermore, each satellite can be operating at a different frequency (e.g., each satellite's signal is at a different frequency).

The GLO receiver 200 can be an example of receiver 100. In one embodiment, the receiver can include a two module (i.e. integrated circuit) solution, such as an RF 210 and a baseband 211. According to another embodiment, the RF 210 and baseband 211 can simply be an RF and baseband modules implemented on a single chip. RF 210 can include an analog-front-end (AFE) 201 and a digital-front-end DFE for GLONASS (DFE_GLO 202).

In one embodiment, the AFE 201 can include the LNA 105, the down-converter 106, the amplifying stage 107 and the ADC 108 of FIG. 1.

In some instances, AFE 201 can output an analog to digital converter (ADC) signal for a received GLONASS signal. The DFE_GLO 202 can receive the AFE 201 output and generate a signal for the output of RF 210. AFE 201 may contain filters, amplifiers, frequency converters, that comprise a receiver. The GLONASS signals may be processed separately from other signals that are present (e.g., GPS, Beidou, Galileo), or the signals may be processed together, and separated in the processing in the baseband 211. In one or more arrangements, one filter can passes both GPS and GLO in one relatively large band. Alternatively, each signal (e.g., GPS, Beidou, GLO) can be filter each separately, but costs increases.

In some instances, AFE 201 can received all the available GLO satellites at the same time, processes the satellites as one signal and passes them all to the DFE_GLO 202. For example, AFE 201 and DFE_GLO 202 can just take a band and process it, in order for the following blocks to find the signals.

A matched filter is a term used to denote that the proper code is applied to de-spread a spread signal, which can be done after DFE_GLO 202 generates a processed signal. The GLO satellites are at different center frequencies. According to some embodiments of GLO receiver 200, the signals from different GLO satellites are effectively split apart after the DFE_GLO 202 process.

In one or more arrangement, the DFE_GLO 202 can include a DSP (e.g., DSP 109) and memory. DFE_GLO 202 can also implement the offset and alias rejection as described in some embodiments of the present invention.

Baseband 211 can include a plurality of search engines 204, and a plurality of tracking engines 205. In some instances, a dual mode interface 203 can receive the output of RF 210 and generate signals for search engines 204 (e.g. at 16 MHz) as well as for tracking engines 205 (e.g. at 8 MHz). In other instances, the baseband 211 can receive multiple inputs, for example multiple WAN bands and GNSS. Accordingly, the baseband 211 may include other receivers (e.g., communication receiver, GNSS receivers). In one embodiment, baseband 211 can be implemented with a standard chip performing these functions. In some implementations, the offset and alias rejection discussed in FIG. 5 can be implemented by baseband 211.

Figure 3:
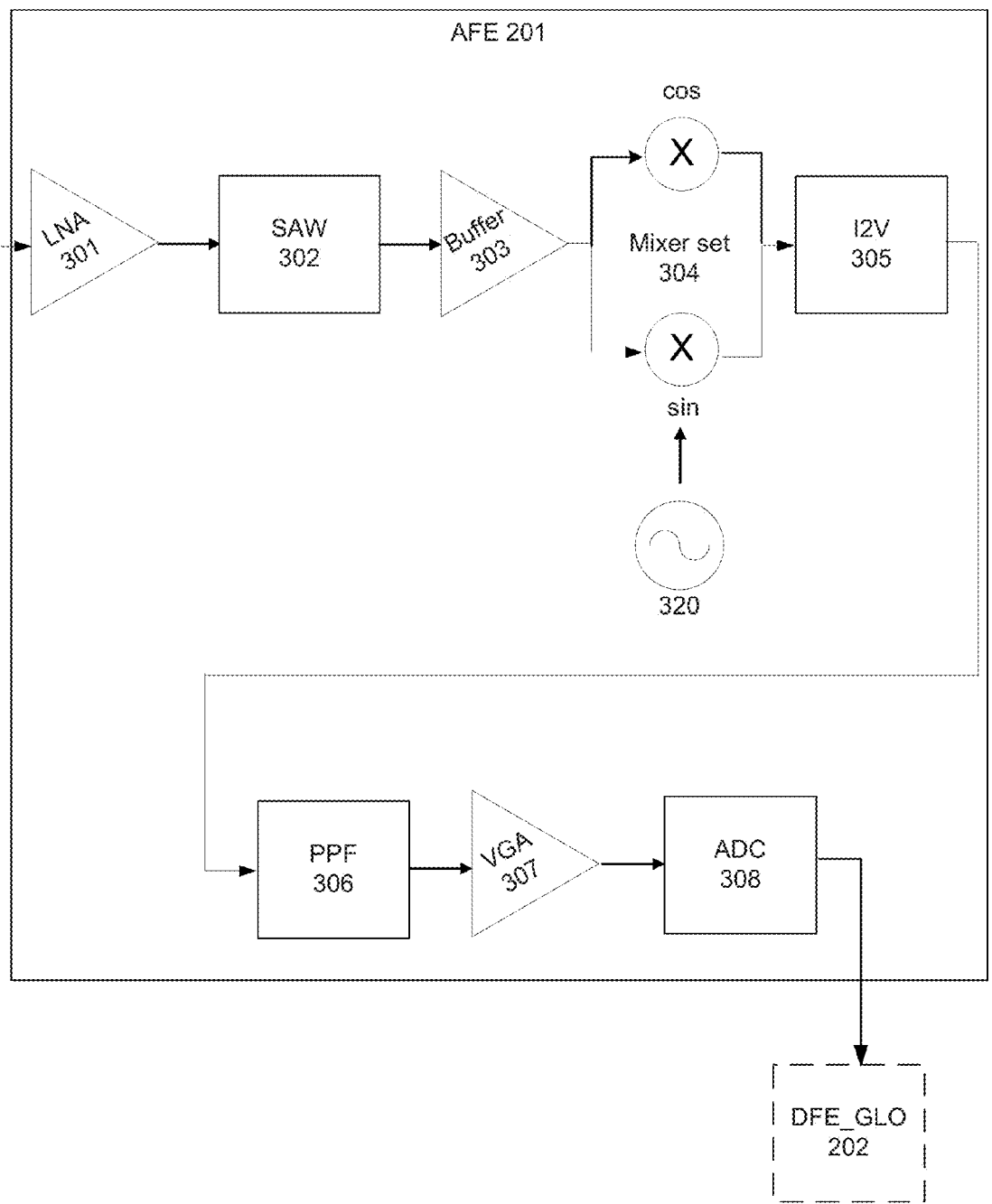
FIG. 3 illustrate an exemplary analog front-end, according to an embodiment.

FIG. 3 can illustrate an exemplary AFE 201 including a low noise amplifier (LNA) 301 that receives a signal (e.g., GNSS signal, GLONASS signal). A surface acoustic wave (SAW) filter 302 can receive the output of LNA 301 and provide bandpass filtering. The SAW filter 302 may pass GLO, GPS, and other signals together. Buffer 303 can receive the output of SAW filter 302 and provide its buffered signal to single mixer set (i.e. a single I/Q mixer pair) 304, wherein one mixer of set 304 further receives a cosine signal from a local oscillator (LO 320) and the other mixer of set 304 further receives a sine signal from the LO 320. These mixer outputs, which are converted from current mode to voltage mode by a current-to-voltage block (I2V) 305, are then provided to a polyphase filter (PPF) 306. The PPF 306 can have complex inputs (I/Q), and may remove the image signal. In some embodiments, the PPF 306 can perform the alias rejection. Voltage gain amplifier (VGA) 307 receives the output of PPF 306. An Analog to digital converter (ADC) 308 (e.g. two 8 bit ADC) receives the amplified output of VGA 307, and then provide signals to DFE_GLO 202 (shown for context in FIG. 2).

Alternatively, FIG. 3 can illustrate modules in an exemplary RF module 101. Therefore, in one or more arrangements, the modules in FIG. 3 (e.g., LO 320, PPF 306) can be incorporated in RF module 101. Additionally, in one or more arrangements, the modules in FIG. 3 (e.g., LO 320, PPF 306) can be incorporated in DSP 109.

Moreover, the AFE 201 in FIG. 3 can be a more detailed example of RF module 101 in FIG. 1, specifically detailing the interaction of the local oscillator with the other components. It can be noted that there may be other embodiments accomplishing the method disclosed, and this embodiment is not limiting. For example, the AFE 201 can include a single local oscillator (LO 320) can be used to generate both the cosine and sine signals for mixer set 304. Additionally, the RF frequency of LO 320 can be set to obtain predetermined intermediate frequency (IF) for the GLONASS signal. In some embodiments, the LO 320 can perform the offset discussed in FIG. 5.

The LO 320 can be tuned, either statically or dynamically. Notably, the setting of the LO frequency can impact the filter implementation for GLONASS (e.g. for polyphase filters (PPF) 306). In some instances, the tuning of the LO 320 frequency can be performed dynamically during normal receiver operation.

In one embodiment, the passband of each of the polyphase filters can be selected as either positive frequencies or negative frequencies. For example, in one embodiment, the GLONASS polyphase filter polarity can be switched to negative frequencies. Such switching may be used to avoid a spur that would otherwise interfere with one of the GLONASS signals. This passband selection can be performed in a static or a dynamic manner.

In current implementations, a receiver can down-convert the GLO signal to center the band at 0 Hz. The signals below the center of the band and the signals above the center of the band can be distinguished based on their phase relationship. Additionally, the phase relationship between the I and Q components of the signals can help distinguish the signal (e.g., +frequency, channel +1, F1 in FIG. 4A) above the center of the band from the signal (e.g., −frequency, channel −1, F2 in FIG. 4A) below the center of the band. For example, a signal at 1 MHz above the center frequency can be distinguished from a signal at 1 MHz below center frequency based on the I and Q components of the signals.

However, in some instances, the sampled signals are not represented perfectly, for example they may have limited bit length, and thus the separation between the plus and minus frequency signals may be less than necessary for the processing blocks to be able to distinguish the signals. For example, power at the −1 MHz signal can be detected when we look for the +1 MHz signal. Additionally, as illustrated in FIG. 7D, when the −1 MHz signal is strong and the +1 MHz signal is weak, the receiver may find the wrong signal (e.g., alias signal). The desired signal (e.g., +1 MHz signal) and aliased signal (e.g., the −1 MHz signal) are different signals from different satellites at different frequencies.

For example, during detection, receiver 100 can look for and receive the entire GLO band. Subsequently, receiver 100 (e.g., RF module 101) can down-convert down the received signal to be centered at 0 Hz. The down-converted signal can include a first half of the band, which is above 0 Hz, and a second half of the band, which is below 0 Hz. When the first half the band is folded over the second half using DSP 109, the −1 channel, which is the first channel below the center, can fall right on top of a +1 channel, which is the first channel above center. By adding an offset using DSP 109, the alias signal can be better distinguished from the desired signal. In another embodiment, the offset and alias rejection can be performed using the LO 320, the mixer set 304 and PPF 306.

As previously mentioned. GLONASS (GLO) satellites have the same code division multiple access (CDMA) spreading code on all the satellite signals. As a result, the codes for the positive and negative frequencies are the same. Thus, when a GLO plus channel (e.g., positive frequencies) is aliased on top of a negative channel (e.g., negative frequencies), methods of code isolation do not give extra isolation. Given that each channel has the same code, code isolation may not work effectively for a GLO system. Therefore, GLO receiver 200 receiving the GLO signals can implement the methods described herein to effectively reject the alias signal by using an offset, in order to find the correct channel and signal.

Moreover, in satellite communications, it can incorrectly be assumed that satellites are at a similar level because all the satellites are overhead. However, satellites near the horizon or satellites blocked by objects (e.g., buildings) may not be at a similar level. As a result, it may not be uncommon to receive a strong satellite from overhead and a weak signal from behind a building. The difference in signal strength between the strong and weak signals can be greater than 30 dB. Thus, as illustrated in FIGS. 7A-D, when the difference in signal strength is high (e.g., greater than 20 dB), it can be difficult discerning a strong signal (e.g., alias signal) at a negative frequency aliasing onto a desired signal from a weak satellite at a positive frequency.

Detecting the wrong signal can occur, for example, when the satellites are different in altitude level. As a result, when the receiver 100 tries to detect the correct satellite, the receiver actual detects a second satellite aliased onto the correct satellite. This is a common problem with CDMA systems, where there is only one code and the receiver keeps finding other satellites. Additionally, some GNSS (e.g., GLONASS) receivers have difficulty handling the case where a very strong alias satellite is present along with a low level desired satellite, the detection of the weak satellite (e.g., desired signal) is masked by false detections of the strong satellite at all code positions.

As previously described, current implementations have receivers that can represent signals in positive and negative frequencies. The signals are kept separate by generating two separate signal paths using M1 and M2, where the signals can have a specific phase relationship (e.g., I signal, Q signal) that allows the signal processing to discern the positive and negative frequencies separately.

Additionally, for GLONASS signals, the signals from different satellites can be separated into different frequency channels. Therefore, as illustrated in FIGS. 4A-B, when the system down-converts the GLONASS signal so that channel 0 is centered on 0 Hz, there can be strong likelihood that the plus channel falls at the same magnitude of frequency as a minus channel.

For example, when the LO 320 is set at the center of channel 0, then channel 1 (e.g., F1 in FIGS. 4A-B) and channel −1 (e.g., F2 in FIGS. 4A-B) can be centered at the same frequency magnitude. The signals can be kept separate by phase relationships between an I and a Q signal. However, the hardware may not be perfect, therefore it is possible to see the channel 1 signal when searching for the channel −1 signal, and vice versa.

FIGS. 4A-B illustrate current implementations without an offset. As illustrated in FIGS. 4A-B, when the negative frequencies are folded over the positive frequencies, the alias of F1 can fall on F2. Therefore, without an offset, the alias rejection may not be sufficient and the receiver 100 can find the wrong signal (e.g., F1).

According to some embodiments, methods of improving the signal alias rejection using an offset are discussed herein. In some instances, detecting the wrong signal can be minimized by offsetting the down-converted signal using DSP 109. By offsetting the down-converted signal, when the negative frequencies (e.g., F1, alias) are folded over, the negative frequencies can fall halfway between two channels. For example, in the folding over process, the channels on the plus frequency (e.g., F2, desired) are halfway between the channels on the minus frequency, which can improve the alias rejection. As a result, when a receiver is searching for one satellite, the receiver may not see the other satellites because of the offset. Furthermore, DSP 109 can reject the alias by filtering out the alias based on the offset frequency.

For example, signals are often modeled as the summation of many sinusoids of different frequencies and different amplitudes. In general, when a sinusoid of frequency F is sampled with frequency F, the resulting samples are indistinguishable from those of another sinusoid of frequency (F−NF$_s$) for any integer N. The values corresponding to N≠0 are called images or aliases of frequency F. Additionally, A negative frequency is equivalent to its absolute value, because sin(−wt+θ)=sin(wt−θ+π), and cos(−wt+θ)=cos(wt−θ). Therefore, aliasing can occur when reconstruct the original waveform from its samples.

Furthermore, regardless of the amplitude vs frequency, the graph of amplitude vs frequency for a single sinusoid at frequency can exhibit symmetry between 0 and F$_s$. This symmetry can be referred to as folding. In some instances, the folding frequency can be referred as the Nyquist frequency. Folding is most often observed in practice when viewing the frequency spectrum of real-valued samples using a discrete Fourier transform.

According to one embodiment, the method, by using DSP 109, can include offsetting the down-converted center frequency of the GLONASS signal by ¼ of a channel as illustrated in FIG. 4C, so the channels at the plus frequency fall at the edge of the channels for the minus frequency. As a result, the offset can make the channel center for the minus frequencies fall at the edge of the positive channels. Therefore, offsetting the channels can provide much better rejection of the alias signal (e.g., undesired signal at the opposite frequency). For example, if the desired signal is at the positive frequency, the alias signal will be at the negative frequency before folding.

FIG. 4D illustrates another example which include offsetting the down-converted center frequency of the GLONASS signal by −¼ of a channel, according to some embodiments.

According to another embodiment, any offset (e.g., offset of plus or minus ¹⁄₃₂, ¹⁄₁₆, ⅛, ¼, ¾, 5/4 of a channel) can be used to provide a higher rejection for the alias signal.

FIGS. 4C-D illustrate implementations with different offsets, according to some embodiments. As illustrated in FIGS. 4C-D, when the negative frequencies are folded over the positive frequencies, the alias of F1 can fall over at F2 between two channels. Therefore, with an offset, the alias rejection has a higher probability of rejecting the alias signal, thus the receiver 100 can better find the correct signal.

The offsets of plus or minus ¼, ¾, 5/4 of a channel will give the most rejection, but other offsets result in a sub optimal improvement over having no offset.

Referring to graphs in FIGS. 4A-D, the x-axis is frequency and the y-axis is signal power. Additionally, GLO signals have the nulls at 511 kHz from the peak at the center. The satellite frequencies can be picked so the nulls of one satellite signal fall at the peak of the adjacent satellite signals.

The method illustrated by FIGS. 4C-D can be implemented using the receiver 100 to receive a high frequency signal using external antenna 104. The received signal can be down-converted using down-converter 106 to a lower frequency in order to process the down-converted signal at the lower frequency. In some instances, the lower frequency used for down-converting can be centered at zero hertz (Hz).

For example, the down-conversion can be achieved by mixing the received signal with LO 320, where the output of the mixing process is the down-converted signal at frequencies equal to the received signal frequency minus the LO frequency.

Additionally, the LO 320 can be set at the same frequency as the center of the received signal in order for the down-converted signal to be centered at zero. Thus, when the LO 320 is centered on the signal, the frequencies above the LO frequency are folded over frequencies below the LO frequency.

The term "positive frequencies" described herein can refer to the signal components of the down-converted signal which results from the downconversion of the input signal frequencies above the LO frequency. Additionally, the term "negative frequencies" described herein can refer to the signal components of the down-converted signal which results from the downconversion of the input signal frequencies below the LO frequency.

Furthermore, when the down-converted signal is centered at a zero hertz (Hz) frequency, the receiver 100 can use phase and code to discern between GLONASS (GLO) channels, which are assigned to different satellites, in the positive and negative frequencies. However, using this method, the system may find a different alias channel when searching for a specific channel.

Figure 5:
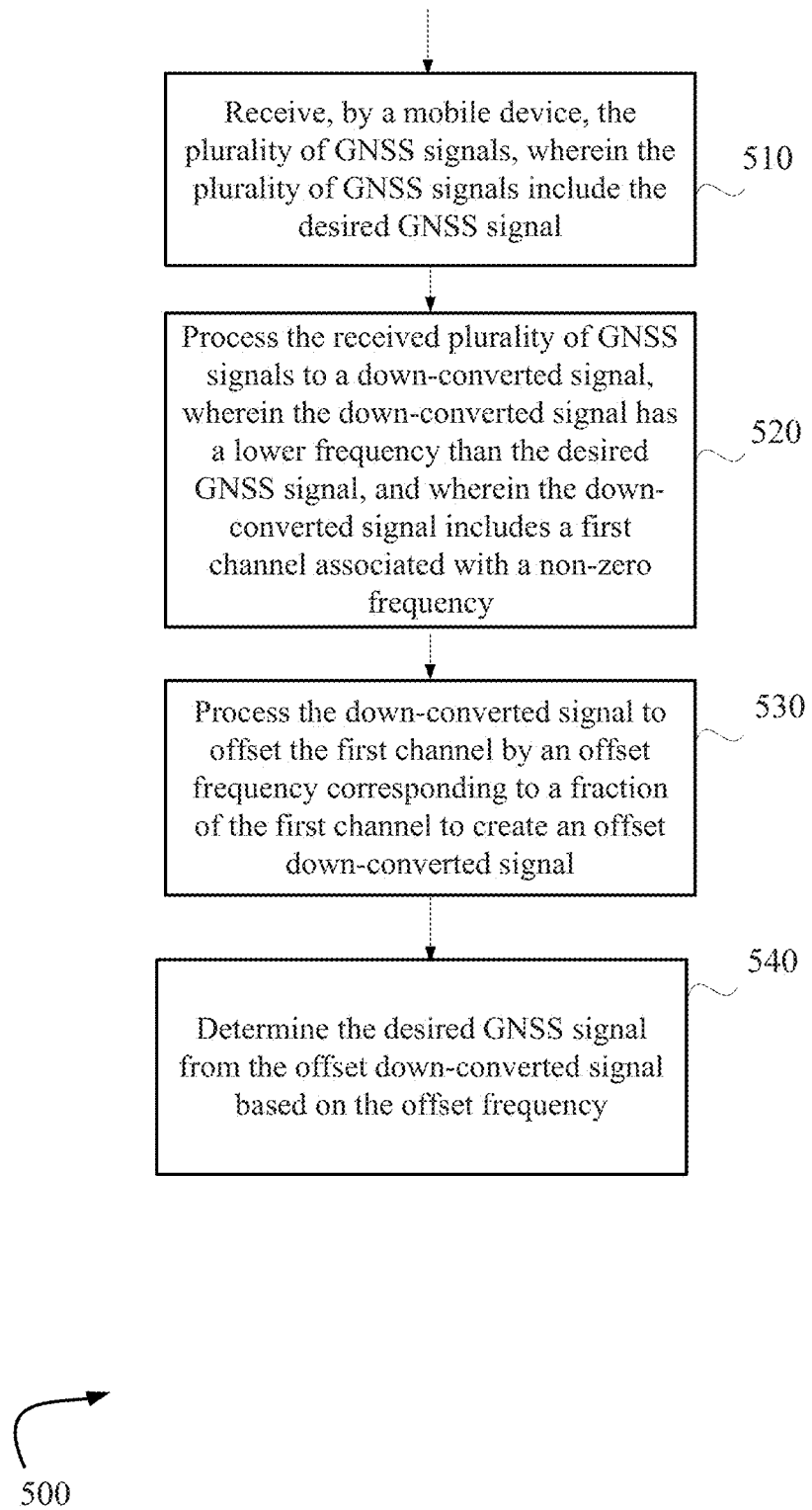
FIG. 5 illustrates a process for improving the alias rejection by using an offset, according to an embodiment.

As illustrated in the process described in FIG. 5, the receiver 100 can improve the alias rejection by using an offset. For example, to help discern channels at the positive and negative frequencies, the RF module 101 can process the GNSS (e.g., GLONASS) signal to a down-converted signal. As previously mentioned, GLONASS can be an example of GNSS signals with a common code. In addition, the GNSS signals with a common code can be broadcast at different frequencies, where each signal is from different satellites. Furthermore, each satellite can be operating at a different frequency (e.g., each satellite's signal is at a different frequency).

In one or more arrangements, DSP 109 can process the downconverted signals to include an offset, where the centers of the folded-over positive frequency channels can fall halfway between the centers of the negative frequency channels, and vice versa. An extra amount of isolation (e.g., based on the offset frequency) occurs by having the centers of the positive frequencies fall halfway between the centers of the negative frequencies. Thus, the receiver 100 (e.g., DSP 109) can better discern channels at positive and negative frequencies with the extra amount of isolation.

At 510, the receiver 100 (e.g., RF module 101, mobile device) can receive the plurality of GNSS signals, wherein the plurality of GNSS signals include the desired GNSS signal. In one or more arrangements, RF module 101 using external antenna 104 can receive the GNSS (e.g., GLONASS) signal. In some embodiments, the receiver 100 at 510 is implemented by the receiver system 1050. In such embodiments, at least portions of 510 may be performed, for example, by the transceiver 1052—e.g., in combination with the modulator 1080—and/or one or more of the processors 1038, 1060, and 1070—e.g., in combination with information and/or instructions from the data source 1036 and/or memory 1072.

At 520, the receiver 100 (e.g., RF module 101) can process the received plurality of GNSS signals to a down-converted signal, wherein the down-converted signal has a lower frequency than the desired GNSS signal, and wherein the down-converted signal includes a first channel associated with a non-zero frequency. In one or more arrangements, as previously described, RF module 101 or AFE 201 can process the received GNSS signals (e.g., GLONASS) to a down-converted signal at 520. The down-converted signal can have a lower frequency than the center frequency associated desired GNSS signal. In some embodiments, the receiver 100 at 520 is implemented by the receiver system 1050. In such embodiments, at least portions of 520 may be performed, for example, by the transceiver 1052—e.g., in combination with the modulator 1080—and/or one or more of the processors 1038, 1060, and 1070—e.g., in combination with information and/or instructions from the data source 1036 and/or memory 1072.

Additionally, in one or more arrangements, the down-converted signal has a first channel associated with a positive frequency and a second channel associated with a negative channel. According to one embodiment, the received GNSS signal can be down-converted using the down-converter 106. In some instances, RF module 101 can down-convert the GLO signal to center the band at 0 Hz.

At 530, the receiver 100 (e.g., DSP 109) can process the down-converted signal to offset the first channel by an offset frequency corresponding to a fraction of the first channel to create an offset down-converted signal. In one or more arrangements, DSP 109 can process the down-converted signal to offset the first channel associated with the positive frequency by an offset frequency corresponding to a fraction of the first channel received at 530. FIGS. 4C-D illustrates examples of processing the down-converted signal to have an offset. Using the offset, the centers of the folded-over positive frequency channels can fall halfway between the centers of the negative frequency channels, thus improving the alias rejection. In some embodiments, the receiver 100 at 530 is implemented by the receiver system 1050. In such embodiments, at least portions of 530 may be performed, for example, by the transceiver 1052—e.g., in combination with the modulator 1080—and/or one or more of the processors 1038, 1060, and 1070—e.g., in combination with information and/or instructions from the data source 1036 and/or memory 1072.

At 540, the receiver 100 (e.g., DSP 109) can determine the desired GNSS signal from the offset down-converted signal based on the offset frequency. For example, DSP 109 can de-spread the offset down-converted signal. The down-converted signal can include an aliased signal (e.g., a second channel associated with a negative frequency). As illustrated in 8D, DSP 109 can reject the aliased signal after the de-spreading by filtering on a frequency range that is based on the offset frequency. Therefore, the aliased signal can be filtered out. In one or more arrangements, DSP 109 can be used for the de-spreading the offset down-converted signal and for rejecting the aliased signal based on the offset frequency. FIGS. 8A-D further describes method of rejecting the aliased signal based on the offset frequency. In some embodiments, the receiver 100 at 540 is implemented by the receiver system 1050. In such embodiments, at least portions of 540 may be performed, for example, by the transceiver 1052—e.g., in combination with the modulator 1080—and/or one or more of the processors 1038, 1060, and 1070—e.g., in combination with information and/or instructions from the data source 1036 and/or memory 1072.

Optionally, the determining at 540 may further comprise de-spreading the offset down-converted signal, where the offset down-converted signal includes an aliased signal associated with the first channel. Additionally the determining at 540 may further comprise rejecting the aliased signal by filtering out the alias signal based on the offset frequency. As previously mentioned, DSP 109 can implement the de-spreading and rejection of the alias signal.

In one or more arrangements, the first channel is a positive frequency. Additionally, the down-converted signal can be centered at or near zero Hertz. Moreover the down-converted signal includes a second channel associated with a negative frequency. The offset at 530 results in the center of the first channel being offset from the center of the second channel. In this example, the center of the aliased signal associated with the first channel and the center of a desired GNSS signal associated with the second channel are offset based on the offset frequency.

Alternatively, in one or more arrangements, the first channel is a negative frequency. The down-converted signal is centered at or near zero Hertz and the down-converted signal. Additionally, the down-converted signal further includes a second channel associated with a positive frequency. The offset at 530 results in the center of the first channel being offset from the center of the second channel. In this example, the center of the aliased signal associated with the first channel and the center of a desired GNSS signal associated with the second channel are offset based on the offset frequency.

Additionally, the processing of the received GNSS signal to a down-converted signal can be done in part by a local oscillator (e.g., included in RF module 101, LO 320) with a frequency equal to the desired signal. Furthermore, the processing of the down-converted signal to offset the first channel by an offset frequency can be done in part by a digital signal processor. The offset frequency can be ¼, ¾, ⅛, 1/16, 1/32 of the first channel.

Moreover, the offset frequency=(¼+N*½)* Channel_Spacing, where N is an integer and Channel_Spacing is a channel spacing associated with the first channel.

In one or more arrangements. RF module 101 can offset the first and second channel so the center of the first channel is offset from the center of the second channel when folder over by DSP 109. Furthermore, DSP 109 can reject the alias based on the offset frequency as illustrated in FIG. 8D.

In one or more arrangements, the centers of the positive frequencies can fall halfway between the centers of the negative frequencies by inputting the down-converted signal into the mixer set 304 (e.g., M1, M2). The LO 320 for the mixer set 304 can be at the same frequency, but with a 90 degree phase relationship. Therefore, the processed signals outputted from the mixer set 304 can be labeled as I and Q, which can stand for In-phase and Quadrature-phase. Furthermore, the processed signals outputted from the mixer set 304 can be labeled either I or Q, which may be arbitrary. For example, the LO 320 applied to mixer M can be at 0 degrees and the LO 320 applied to mixer M2 can be shifted by 90 degrees. Furthermore, the down-converted signal that is above the LO 320 can be mixed to the output of the mixers M1 and M2. As a result, all the frequency components outputted from M1 that come from the down-converted signal with frequencies above the LO 320 can lead the same components out of M2 by 90 degrees. Alternatively, all the signal components output from M1 from the down-converted signal with frequencies below the LO can lag the frequency components outputted from M2 by 90 degrees. Therefore, the receiver 100 can use the lead and lag relationships to tell positive frequencies from negative frequencies.

Furthermore, real systems can have limitations on how well the isolation works. Systems without calibration can have about 20 dB isolation between the positive and negative frequencies. For example, when the positive and negative frequencies each have a sine wave at equal levels, the system looking for the positive frequencies can also see the negative frequencies at 20 dB lower than the positive frequencies. Additionally, systems with calibration can have more than 30 dB of isolation.

Figure 6:
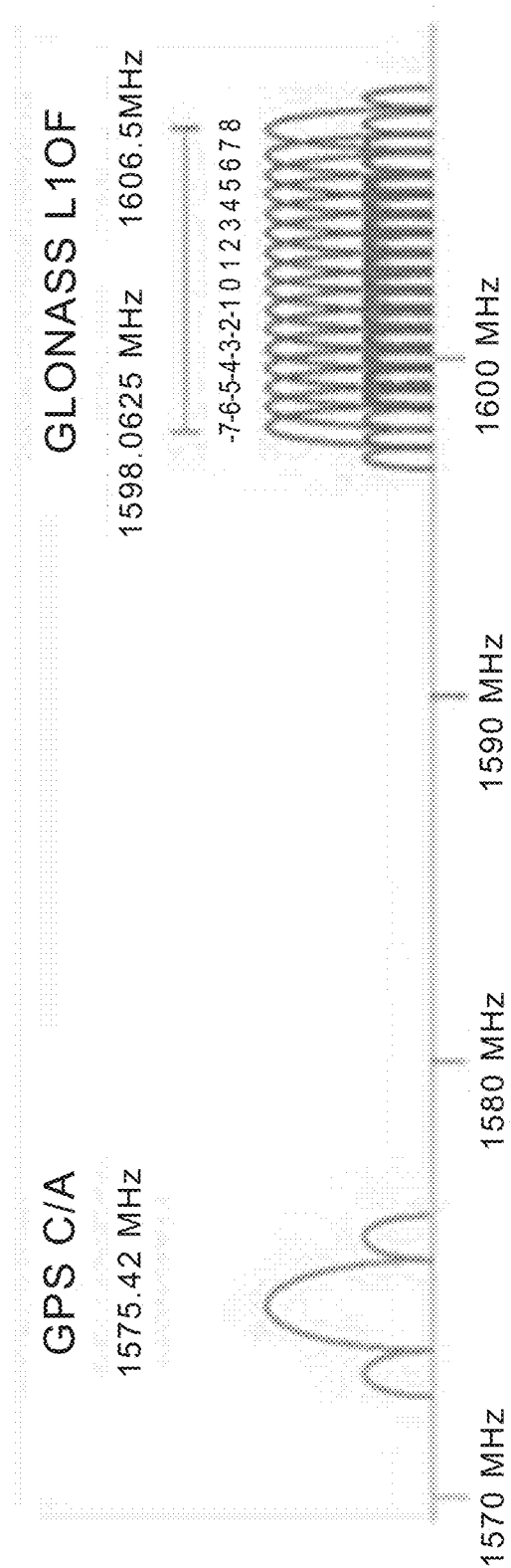
FIG. 6 illustrates exemplary GLONASS signals and GPS signals according to an embodiment.

As illustrated in FIG. 6, the GLO signals also use CDMA code spreading. In GPS and other CDMA systems the various signals have different spreading codes, but in GLO the codes are the same on all satellites. As a result, GLO signals may not have code isolation advantage in discerning the channel. Thus, any de-spreading process by the system can find more than one GLO satellites. The signals from the different GLO satellites may be at different code position for each satellite, but there is no mitigation of the peak level due to code isolation.

In the following example, Channel +1 is the desired signal, and channel −1 is the image.

In FIGS. 7A-8D, the y-axis can represent signal power and the x-axis can represent frequency. Additionally, GLO signals have the nulls at 511 kHz from the peak at the center. The satellite frequencies can be picked so the nulls of one satellite signal fall at the peak of the adjacent satellite signals. Furthermore, in some instances, the darkest curve is supposed to be the desired satellite signal, the other highlighted signal is the undesired alias, and the rest of the signals are there to show other satellites that are not really causing interference.

Figure 7A:
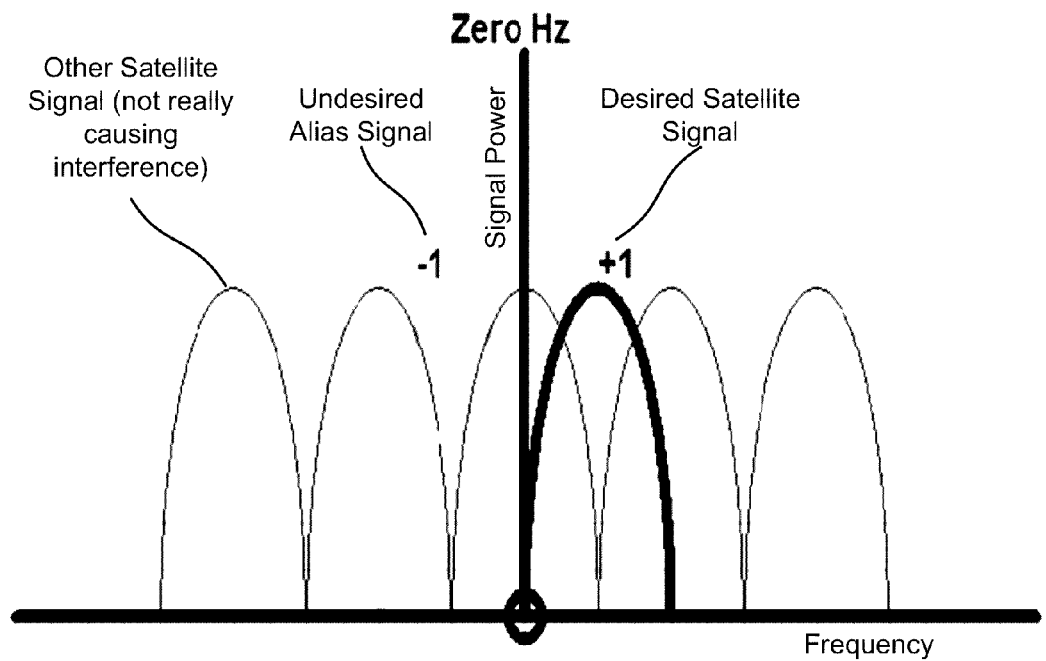
FIGS. 7A-D illustrates implementation of the alias rejection process for a GLONASS signal without an offset.

FIG. 7A illustrates an example when the receiver 100 down-converts Channel 0 to the center frequency of 0 Hz. Furthermore, Channel 1 and Channel −1 are at the same frequencies out of the mixers (e.g., M1, M2), but Channel −1 is at negative frequencies and Channel +1 is at positive frequencies. Additionally, I and Q signals with the imperfections that have been discussed are used to represent these signals.

Figure 7B:
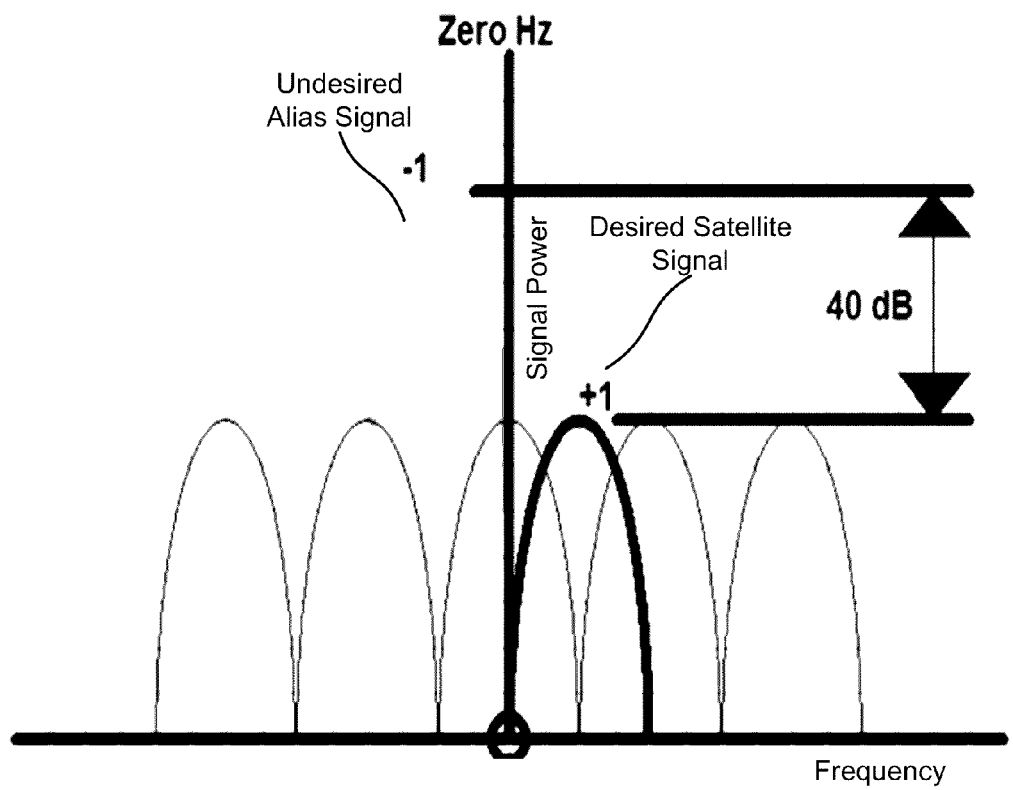
Figure 7C:
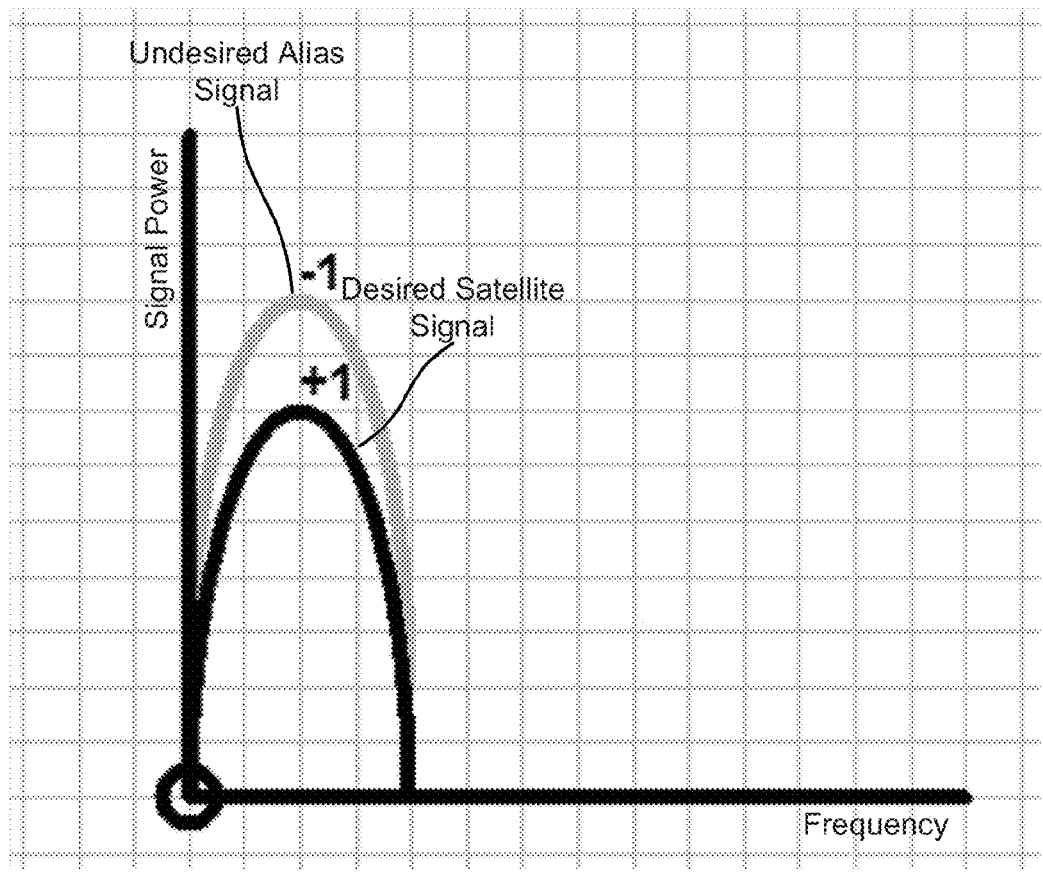
Figure 7D:
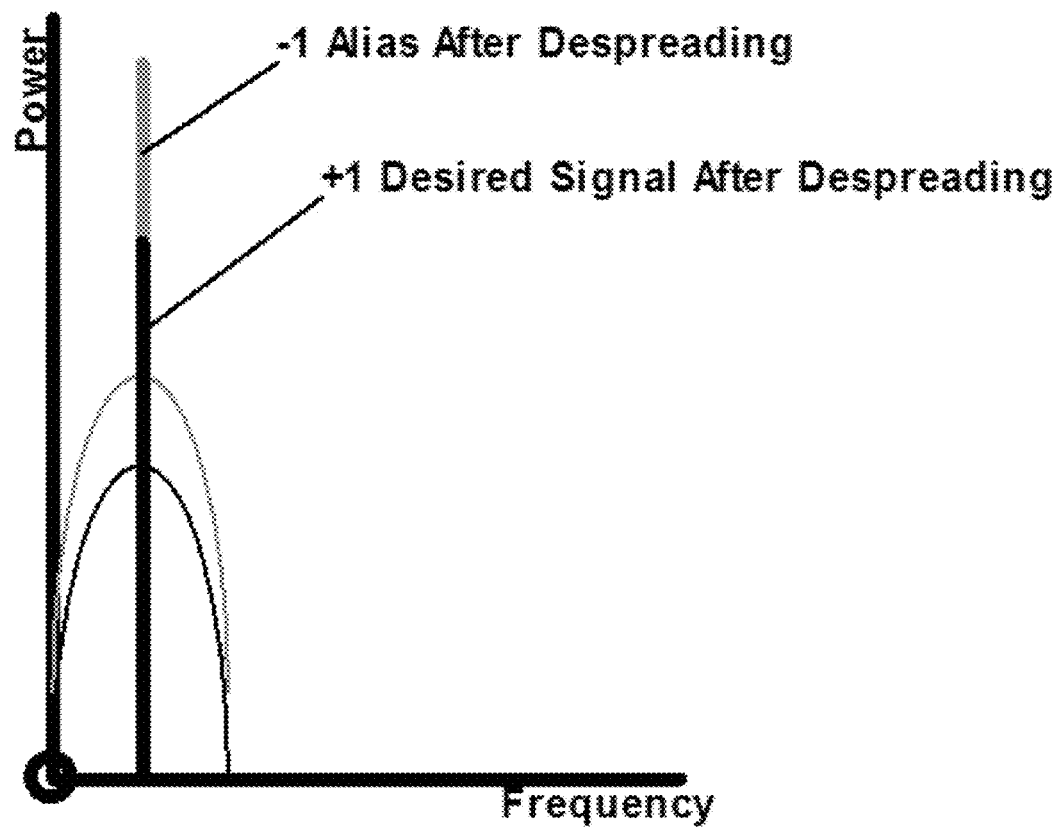

Furthermore, FIG. 7B illustrates a scenario where the magnitude of Channel −1 is 40 dB higher than the magnitude of Channel +1. As illustrated in FIG. 7C, when the negative frequencies (e.g., Channel −1) from the example in FIG. 7B are folded over the positive frequencies (e.g., Channel +1), the signal from channel +1 is lower than the image from channel −1.

As illustrated in FIG. 7D, when the down-converted signal from 7C is de-spread, the alias signal (e.g., channel −1) can have a higher power than the desired signal (e.g., channel +1). Thus the image rejection in the system may be insufficient to correctly reject the −1 channel signal due to the high level of the −1 signal.

According to some embodiments of the present invention, the receiver 100 can stop alias channels from falling directly over the desired channel in order to correctly reject the alias or image signal. In some embodiment, the system can stop alias channels from falling directly over the desired channel by using an offset. For example, for GLONASS the offset can be where the center of a channel is 127.75 kHz from the zero Hz by using the LO to offset the outputs from mixers (e.g., M1, M2). In some instances, the offset can be at other frequencies. Alternatively, DSP 109 can be used to implement the offset. The offset can be any amount that places the center frequency of the alias signal at a different frequency than the center of the desired signal and improves the detection of the desired signal in the presence of an alias signal.

In one or more arrangements, the down-converted signal can be offset by an offset frequency corresponding to a fraction of the first channel. The fraction can include, but not limited to, 1/32, 1/16, 1/8, 1/4, 3/4 or 5/4. The fraction can be any value that improves the alias rejection. Alias rejection can be improved by shifting the peak of the desired signal away from the peaks of the image signals.

Figure 8A:
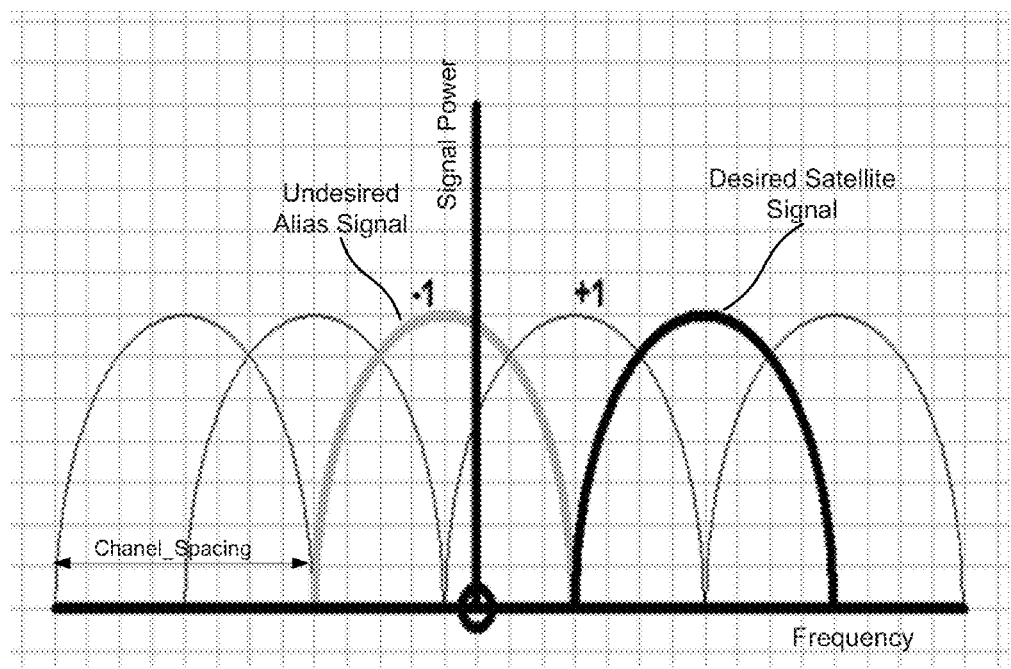
FIGS. 8A-D illustrates the alias rejection process for a GLONASS signal with an offset, according to some embodiments.

FIG. 8A illustrates a method to stop alias channels from falling directly over the desired channel by using an offset, according to one embodiment. The channel spacing (e.g., Channel_Spacing) illustrated in FIG. 8A can be the frequency difference between two different channels (e.g., frequency width of a channel). When the received signal is down-converted, the LO can be placed 1/8 of a channel from the center of Channel 0, as illustrated in FIG. 8A. Alternatively, DSP 109 can be used to implement the offset illustrated in FIG. 8A.

Figure 8B:
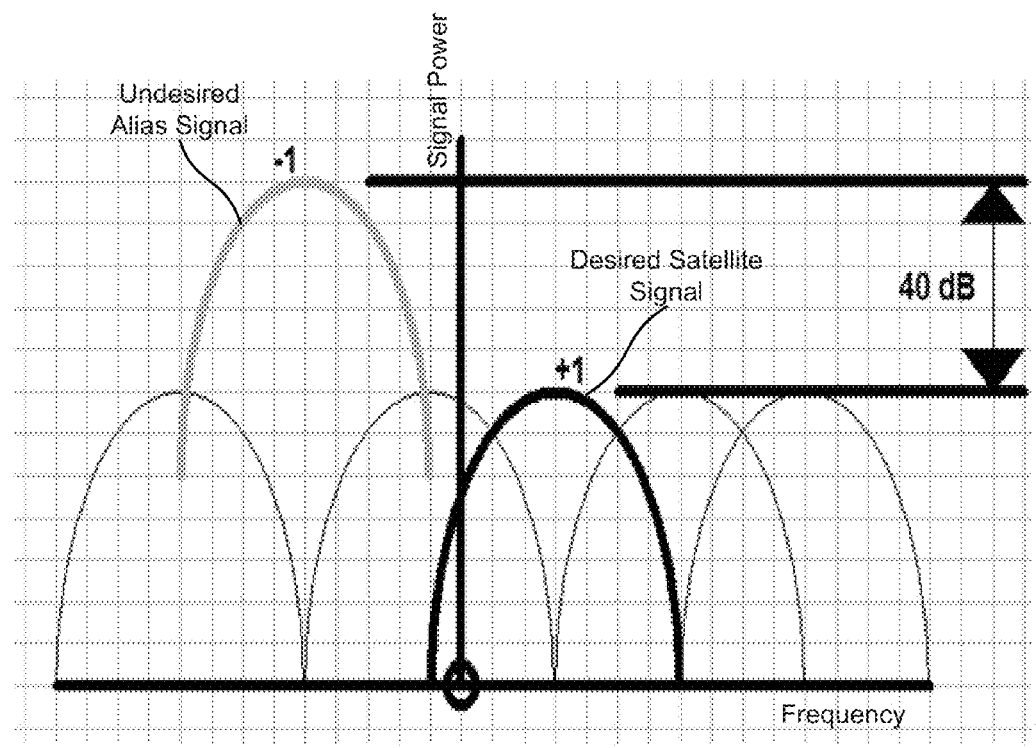

In the processing, the system can be looking for Channel +1, while Channel −1 is 40 dB higher than Channel +1, as illustrated in FIG. 8B.

Figure 8C:
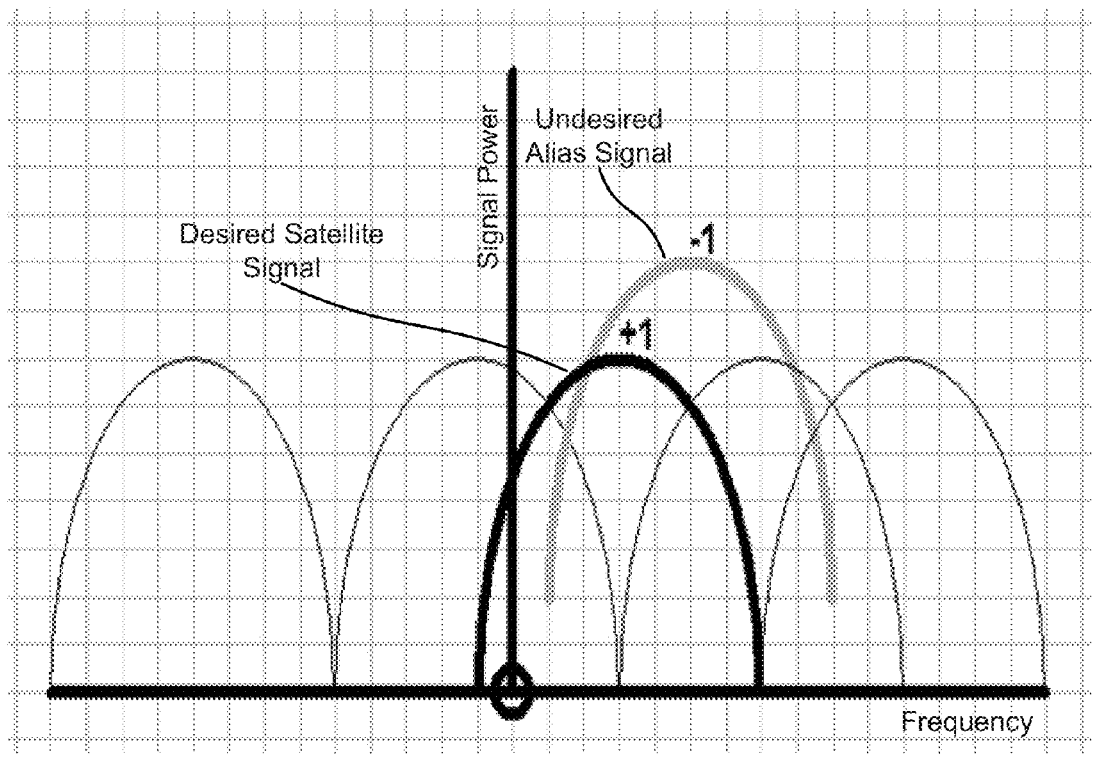
Figure 8D:
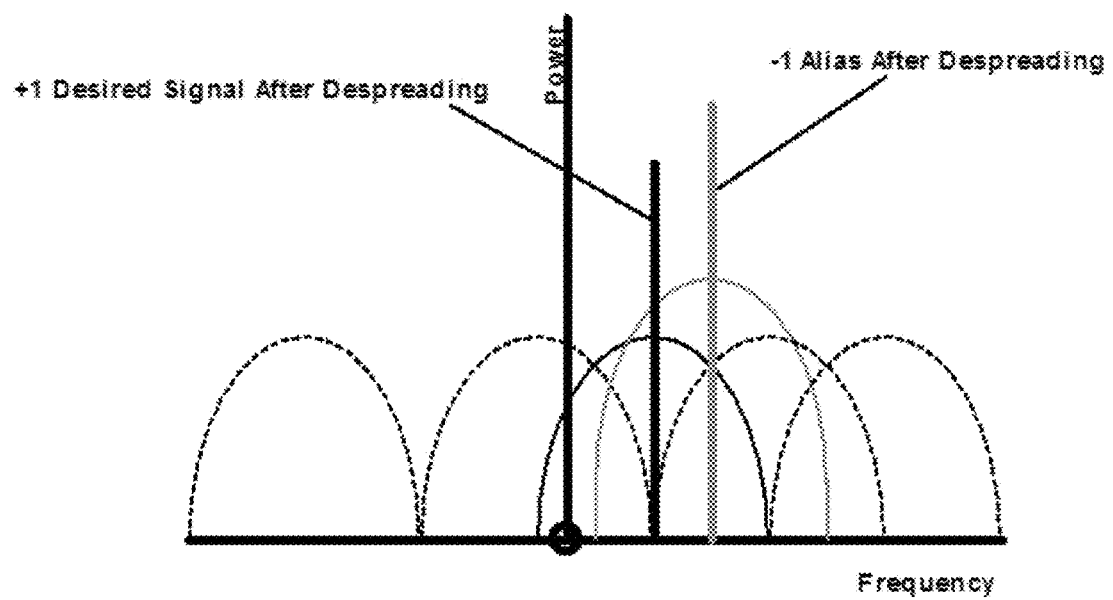

The alias of Channel −1 can fall/of a channel from the center of Channel +1, as illustrated in FIG. 8C. In the case of GLONASS, as a result of the offset when the processed signals are de-spread, the Channel −1 signal can be approximately 128 kHz away from the signal for Channel +1 as illustrated in FIG. 8D. Additionally, as previously mentioned, because of the offset, any cross correlation products from channel −1 can be significantly reduced. Therefore, after de-spreading, DSP 109 can filter on a frequency range associated with a specific frequency (e.g., offset frequency), the alias signal can be rejected (e.g., filtered out), and the desired signal can be correctly determined. As a result, the desired signal (e.g. GLONASS signal associated with channel +1) can be determined based on the offset frequency. Alternatively, baseband module 102, DFE_GLO 202, and/or baseband 211 can be used for alias rejection.

In some instances, using an offset can improve the alias rejection. For example, the process illustrated in FIG. 5 can improve the alias rejection in a GLONASS receiver by more than 10 dB.

Figure 9:
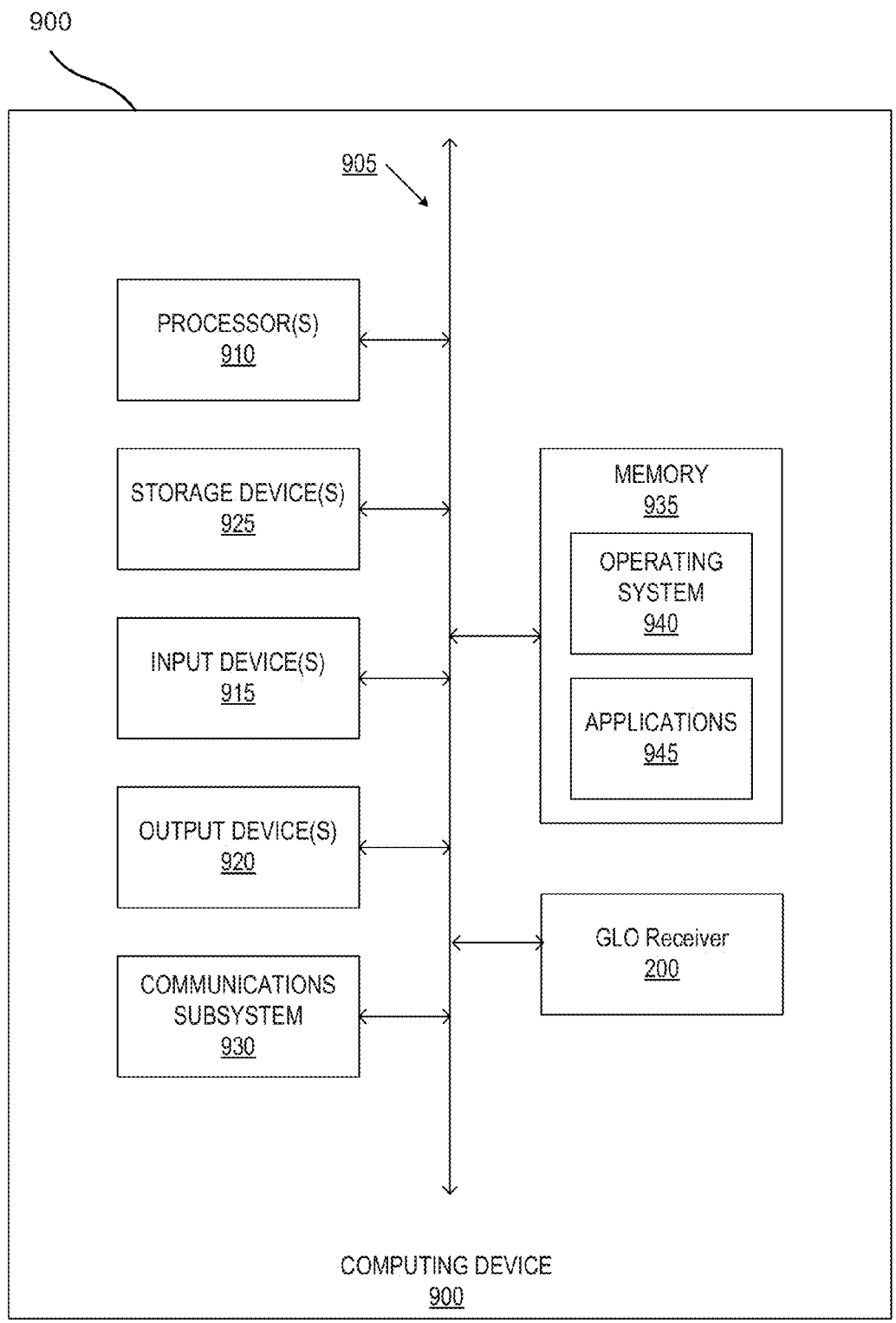
FIG. 9 illustrates an example of a computing system in which one or more embodiments may be implemented.

An example of a computing system in which various aspects of the disclosure may be implemented is now described with respect to FIG. 9. The computing system may exemplify receiver 100, DSP 109. GLO receiver 200. AFE 201 and DFE GLO 202 and as referenced herein elsewhere. According to one or more aspects, a computer system as illustrated in FIG. 9 may be incorporated as part of a computing device, which may implement, perform, and/or execute any and/or all of the features, methods, and/or method steps described herein. For example, computer system 900 may represent some of the components of a hand-held device. A hand-held device may be any computing device with an input sensory unit, such as a camera and/or a display unit. Examples of a hand-held device include but are not limited to video game consoles, tablets, smart phones, and mobile devices. In one embodiment, the system 900 is configured to implement the method 500 described in FIG. 5. FIG. 9 provides a schematic illustration of one embodiment of a computer system 900 that can perform the methods provided by various other embodiments, as described herein, and/or can function as the host computer system, a remote kiosk/terminal, a point-of-sale device, a mobile device, a set-top box, and/or a computer system. FIG. 9 is meant only to provide a generalized illustration of various components, any and/or all of which may be utilized as appropriate. FIG. 9, therefore, broadly illustrates how individual system elements may be implemented in a relatively separated or relatively more integrated manner.

The computer system 900 is shown comprising hardware elements that can be electrically coupled via a bus 905 (or may otherwise be in communication, as appropriate). In one embodiment, the bus 905 can be data bus 103. The hardware elements may include one or more processors 910 (e.g., DSP 109, main processor 111), including without limitation one or more general-purpose processors and/or one or more special-purpose processors (such as digital signal processing chips, graphics acceleration processors, and/or the like); one or more input devices 915, which can include without limitation a camera, a mouse, a keyboard and/or the like; and one or more output devices 920, which can include without limitation a display unit, a printer and/or the like.

The computer system 900 may further include (and/or be in communication with) one or more non-transitory storage devices 925, which can comprise, without limitation, local and/or network accessible storage, and/or can include, without limitation, memory 110, a disk drive, a drive array, an optical storage device, a solid-state storage device such as a random access memory ("RAM") and/or a read-only memory ("ROM"), which can be programmable, flash-updateable and/or the like. Such storage devices may be configured to implement any appropriate data storage, including without limitation, various file systems, database structures, and/or the like.

The computer system 900 might also include a communications subsystem 1330, which can include without limitation a modem, a network card (wireless or wired), an infrared communication device, a wireless communication device and/or chipset (such as a Bluetooth® device, an 802.11 device, a WiFi device, a WiMax device, cellular communication facilities, etc.), and/or the like. According to one embodiment of the present invention, the receiver 100. GLO receiver 200 can be examples of a communication subsystem 930. According to another embodiment, GLO receiver 200 can be a separate communication subsystem. In one or more arrangements, computing device 900 can have multiple instances of communications subsystem 930, as computing device 900 can have multiple communication modes, each with its respective communication subsystem 930. The communications subsystem 930 may permit data to be exchanged with a network (such as the network described below, to name one example), other computer systems, and/or any other devices described herein. In many embodiments, the computer system 900 may further comprise a non-transitory working memory 935, which can include a RAM or ROM device, as described above. According to one embodiment of the present invention, the memory 110 can be examples of a non-transitory working memory 935.

The computer system 900 also can comprise software elements, shown as being currently located within the working memory 935, including an operating system 940, device drivers, executable libraries, and/or other code, such as one or more application programs 945, which may comprise computer programs provided by various embodiments, and/or may be designed to implement methods, and/or configure systems, provided by other embodiments, as described herein. Merely by way of example, one or more procedures described with respect to the method(s) discussed above, for example as described with respect to FIG. 5, might be implemented as code and/or instructions executable by a computer (and/or a processor within a computer); in an aspect, then, such code and/or instructions can be used to configure and/or adapt a general purpose computer (or other device) to perform one or more operations in accordance with the described methods. For example the digitalized signal can be stored in working memory 935.

A set of these instructions and/or codes might be stored on a computer-readable storage medium, such as the storage device(s) 925 described above. In some cases, the storage medium might be incorporated within a computer system, such as computer system 900. In other embodiments, the storage medium might be separate from a computer system (e.g., a removable medium, such as a compact disc), and/or provided in an installation package, such that the storage medium can be used to program, configure and/or adapt a general purpose computer with the instructions/code stored thereon. These instructions might take the form of executable code, which is executable by the computer system 900 and/or might take the form of source and/or installable code, which, upon compilation and/or installation on the computer system 700 (e.g., using any of a variety of generally available compilers, installation programs, compression/decompression utilities, etc.) then takes the form of executable code.

Substantial variations may be made in accordance with specific requirements. For example, customized hardware might also be used, and/or particular elements might be implemented in hardware, software (including portable software, such as applets, etc.), or both. Further, connection to other computing devices such as network input/output devices may be employed.

Some embodiments may employ a computer system (such as the computer system 900) to perform methods in accordance with the disclosure. For example, some or all of the procedures of the described methods may be performed by the computer system 900 in response to processor 910 executing one or more sequences of one or more instructions (which might be incorporated into the operating system 940 and/or other code, such as an application program 945) contained in the working memory 935. Such instructions may be read into the working memory 935 from another computer-readable medium, such as one or more of the storage device(s) 925. Merely by way of example, execution of the sequences of instructions contained in the working memory 935 might cause the processor(s) 910 to perform one or more procedures of the methods described herein, for example one or more of the elements of the method described with respect to FIG. 5.

The terms "machine-readable medium" and "computer-readable medium," as used herein, refer to any medium that participates in providing data that causes a machine to operate in a specific fashion. In an embodiment implemented using the computer system 900, various computer-readable media might be involved in providing instructions/code to processor(s) 910 for execution and/or might be used to store and/or carry such instructions/code (e.g., as signals). In many implementations, a computer-readable medium is a physical and/or tangible storage medium. Such a medium may take many forms, including but not limited to, non-volatile media, volatile media, and transmission media. Non-volatile media include, for example, optical and/or magnetic disks, such as the storage device(s) 925. Volatile media include, without limitation, dynamic memory, such as the working memory 935. Transmission media include, without limitation, coaxial cables, copper wire and fiber optics, including the wires that comprise the bus 905, as well as the various components of the communications subsystem 930 (and/or the media by which the communications subsystem 930 provides communication with other devices). Hence, transmission media can also take the form of waves (including without limitation radio, acoustic and/or light waves, such as those generated during radio-wave and infrared data communications). According to some embodiments, the receiver 100, the GLO receiver 200 can utilize a communication subsystem 930 to communicate with each other.

Figure 10:
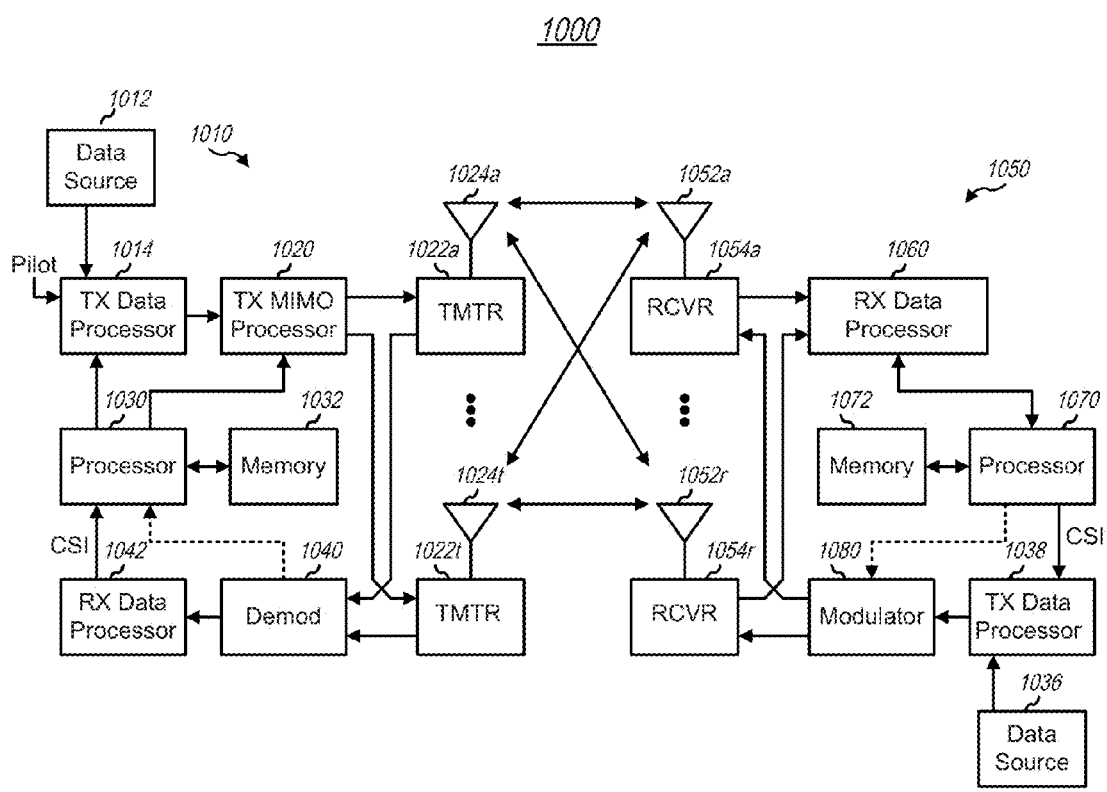
FIG. 10 is a block diagram of an embodiment of a transmitter system and a receiver system.

FIG. 10 is a block diagram of an embodiment of a transmitter system 1010 and a receiver system 1050 in a system 1000. According to some embodiments, transmitter system 1010 can be an example of receiver 100. Additionally, receiver system 1050 can be an example of receiver 100 or GLO receiver 200.

At the transmitter system 1010, traffic data for a number of data streams is provided from a data source 1012 to a transmit (TX) data processor 1014. In some embodiments, each data stream is transmitted over a respective transmit antenna. TX data processor 1014 formats, codes, and interleaves the traffic data for each data stream based on a particular coding scheme selected for that data stream to provide coded data.

The coded data for each data stream may be multiplexed with pilot data using OFDM techniques. The pilot data is typically a known data pattern that is processed in a known manner and may be used at the receiver system to estimate the channel response. The multiplexed pilot and coded data for each data stream are then modulated (i.e., symbol mapped) based on a particular modulation scheme (e.g., BPSK, QSPK, M-PSK, or M-QAM) selected for that data stream to provide modulation symbols. The data rate, coding, and modulation for each data stream may be determined by instructions performed by processor 1030. The instructions can be stored in memory 1032.

The modulation symbols for all data streams are then provided to a TX processor 1020, which may further process the modulation symbols (e.g., for OFDM). TX processor 1020 then provides NT modulation symbol streams to NT transmitters (TMTR) 1022a through 1022t. In certain embodiments, TX processor 1020 applies beamforming weights to the symbols of the data streams and to the antenna from which the symbol is being transmitted.

Each transmitter 1022 receives and processes a respective symbol stream to provide one or more analog signals, and further conditions (e.g., amplifies, filters, and upconverts) the analog signals to provide a modulated signal suitable for transmission over the channel. NT modulated signals from transmitters 1022a through 1022t are then transmitted from NT antennas 1024a through 1024t, respectively.

At receiver system 1050, the transmitted modulated signals are received by NR antennas 1052a through 1052r and the received signal from each antenna 1052 is provided to a respective receiver (RCVR) 1054a through 1054r. Each receiver 1054 conditions (e.g., filters, amplifies, and down-converts) a respective received signal, digitizes the conditioned signal to provide samples, and further processes the samples to provide a corresponding "received" symbol stream.

An RX data processor 1060 then receives and processes the NR received symbol streams from NR receivers 1054 based on a particular receiver processing technique to provide NT "detected" symbol streams. The RX data processor 1060 then demodulates, deinterleaves, and decodes each detected symbol stream to recover the traffic data for the data stream. The processing by RX data processor 1060 is complementary to that performed by TX processor 1020 and TX data processor 1014 at transmitter system 1010.

A processor 1070 periodically determines which pre-coding matrix, which can be stored in memory 1072, to use (discussed below). Processor 1070 formulates a reverse link message comprising a matrix index portion and a rank value portion.

The reverse link message may comprise various types of information regarding the communication link and/or the received data stream. The reverse link message is then processed by a TX data processor 1038, which also receives traffic data for a number of data streams from a data source 1036, modulated by a modulator 1080, conditioned by transmitters 1054a through 1054r, and transmitted back to transmitter system 1010. Two or more receiver, transmitter, and antenna groups may be configured to access separate networks, for example a WLAN network and an LTE, WCDMA, or cdma2000 HPRD network. In some embodiments, a single receiver, transmitter, and antenna group may be configured to access at least two separate networks. Similarly, a plurality of processors may be included to process communications and/or data for a plurality of networks. Further, a single processor may be configured to process communications and/or data for a plurality of networks.

At transmitter system 1010, the modulated signals from receiver system 1050 are received by antennas 1024, conditioned by receivers 1022, demodulated by a demodulator 1040, and processed by a RX data processor 1042 to extract the reserve link message transmitted by the receiver system 1050. Processor 1030 then determines which pre-coding matrix to use for determining the beamforming weights and then processes the extracted message.

In one or more examples, the functions described may be implemented in hardware, software, firmware, or any combination thereof. If implemented in software, the functions may be stored on or transmitted over as one or more instructions or code on a computer-readable medium. Computer-readable media may include computer data storage media. Data storage media may be any available media that can be accessed by one or more computers or one or more processors to retrieve instructions, code and/or data structures for implementation of the techniques described in this disclosure. "Data storage media" as used herein refers to manufactures and does not refer to transitory propagating signals. By way of example, and not limitation, such computer-readable media can comprise RAM, ROM. EEPROM, CD-ROM or other optical disk storage, magnetic disk storage, or other magnetic storage devices, flash memory, or any other medium that can be used to store desired program code in the form of instructions or data structures and that can be accessed by a computer. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above may also be included within the scope of computer-readable media.

The code may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware stored on computer-readable media.

What is claimed is:

1. A method for isolating a first GNSS signal from a plurality of GNSS signals, the method comprising:
   receiving, by a mobile device, the plurality of GNSS signals, wherein the plurality of GNSS signals includes the first GNSS signal;
   processing the received plurality of GNSS signals to a down-converted signal, wherein the down-converted signal has a lower frequency than the first GNSS signal, and wherein the down-converted signal includes a first channel associated with a non-zero frequency;
   processing the down-converted signal to offset the first channel by an offset frequency corresponding to a fraction of the first channel to create an offset down-converted signal; and
   determining the first GNSS signal from the offset down-converted signal based on the offset frequency.

2. The method of claim 1, wherein the determining further comprises:
   de-spreading the offset down-converted signal, wherein the offset down-converted signal includes an aliased signal associated with the first channel; and
   rejecting the aliased signal by filtering out the aliased signal based on the offset frequency.

3. The method of claim 2, wherein the first channel is a positive frequency, and wherein the down-converted signal is centered at or near zero Hertz and the down-converted signal further includes a second channel associated with a negative frequency, and wherein offsetting the first channel results in a center of the first channel being offset from a center of the second channel.

4. The method of claim 3, wherein the center of the aliased signal associated with the first channel and the center of a second GNSS signal associated with the second channel are offset based on the offset frequency.

5. The method of claim 2, wherein the first channel is a negative frequency, and wherein the down-converted signal is centered at or near zero Hertz and the down-converted signal further includes a second channel associated with a positive frequency, and wherein offsetting the first channel results in the center of the first channel being offset from the center of the second channel.

6. The method of claim 5, wherein the center of the aliased signal associated with the first channel and the center of a first GNSS signal associated with the second channel are offset based on the offset frequency.

7. The method of claim 1, wherein the processing of the down-converted signal to offset the first channel by the offset frequency is done in part by a digital signal processor or a general processor.

8. The method of claim 1, wherein the offset frequency is one-quarter of the first channel.

9. The method of claim 1, wherein the offset frequency is three-quarters of the first channel.

10. The method of claim 1, wherein the offset frequency is one-eighth of the first channel.

11. The method of claim 1, where N is an integer and Channel_Spacing is a channel spacing associated with the first channel, and wherein the offset frequency is:

$$\text{Offset frequency} = (\tfrac{1}{4} + N * \tfrac{1}{2}) * \text{Channel\_Spacing}.$$

12. The method of claim 1, wherein the offset frequency is a fractional offset of a multiple of a half channel associated with the first channel.

13. A device for isolating a first GNSS signal from a plurality of GNSS signals, the device comprising:
   memory;
   one or more radio frequency (RF) receivers to:
      receive the plurality of GNSS signals, wherein the plurality of GNSS signals include the first GNSS signal; and
      process the received plurality of GNSS signals to a down-converted signal, wherein the down-converted signal has a lower frequency than the first GNSS signal, and wherein the down-converted signal includes a first channel associated with a non-zero frequency; and
   one or more processors configured to:
      process the down-converted signal to offset the first channel by an offset frequency corresponding to a fraction of the first channel to create an offset down-converted signal; and
      determine the first GNSS signal from the offset down-converted signal based on the offset frequency.

14. The device of claim 13, the one or more processors further configured to:
   de-spread the offset down-converted signal, wherein the offset down-converted signal includes an aliased signal associated with the first channel; and
   reject the aliased signal by filtering out the aliased signal based on the offset frequency.

15. The device of claim 14, wherein the first channel is a positive frequency, and wherein the down-converted signal is centered at or near zero Hertz and the down-converted signal further includes a second channel associated with a negative frequency, and wherein offsetting the first channel results in a center of the first channel being offset from a center of the second channel.

16. The device of claim 15, wherein the center of the aliased signal associated with the first channel and the center of a first GNSS signal associated with the second channel are offset based on the offset frequency.

17. The device of claim 14, wherein the first channel is a negative frequency, and wherein the down-converted signal is centered at or near zero Hertz and the down-converted signal further includes a second channel associated with a positive frequency, and wherein offsetting the first channel results in the center of the first channel being offset from the center of the second channel.

18. The device of claim 17, wherein the center of the aliased signal associated with the first channel and the center of a second GNSS signal associated with the second channel are offset based on the offset frequency.

19. The device of claim 13, wherein the one or more RF receivers include a local oscillator, and wherein the processing of the received plurality of GNSS signals to the down-converted signal is done in part by the local oscillator with a frequency equal to the first GNSS signal.

20. The device of claim 13, wherein the one or more processors include one or more digital signal processors.

21. The device of claim 13, wherein the offset frequency is one-quarter of the first channel.

22. The device of claim 13, wherein the offset frequency is three-quarters of the first channel.

23. The device of claim 13, wherein the offset frequency is one-eighth of the first channel.

24. The device of claim 13, where N is an integer and Channel_Spacing is a channel spacing associated with the first channel, and wherein the offset frequency is:

$$\text{Offset frequency}=(\tfrac{1}{4}+N*\tfrac{1}{2})*\text{Channel\_Spacing}.$$

25. The device of claim 13, wherein the offset frequency is a fractional offset of a multiple of a half channel associated with the first channel.

26. One or more non-transient computer-readable media storing computer-executable instructions, for isolating a first GNSS signal from a plurality of GNSS signals, to:
  receive, by one or more RF modules, the plurality of GNSS signals, wherein the plurality of GNSS signals include the first GNSS signal;
  process, by the one or more RF modules, the received plurality of GNSS signals to a down-converted signal, wherein the down-converted signal has a lower frequency than the first GNSS signal, and wherein the down-converted signal includes a first channel associated with a non-zero frequency;
  process, by one or more processors, the down-converted signal to offset the first channel by an offset frequency corresponding to a fraction of the first channel to create an offset down-converted signal; and
  determine, by the one or more processors, the first GNSS signal from the offset down-converted signal based on the offset frequency.

27. The one or more computer-readable media of claim 26, further comprising computer-readable instructions to:
  de-spread, by the one or more processors, the offset down-converted signal, wherein the offset down-converted signal includes an aliased signal associated with the first channel; and
  reject, by the one or more processors, the aliased signal by filtering out the aliased signal based on the offset frequency.

28. The one or more computer-readable media of claim 27, wherein the first channel is a positive frequency, and wherein the down-converted signal is centered at or near zero Hertz and the down-converted signal further includes a second channel associated with a negative frequency, and wherein offsetting the first channel results in a center of the first channel being offset from a center of the second channel.

29. The one or more computer-readable media of claim 28, wherein the center of the aliased signal associated with the first channel and the center of a first GNSS signal associated with the second channel are offset based on the offset frequency.

30. The one or more computer-readable media of claim 27, wherein the first channel is a negative frequency, and wherein the down-converted signal is centered at or near zero Hertz and the down-converted signal further includes a second channel associated with a positive frequency, and wherein offsetting the first channel results in the center of the first channel being offset from the center of the second channel.

31. The one or more computer-readable media of claim 30, wherein the center of the aliased signal associated with the first channel and the center of a second GNSS signal associated with the second channel are offset based on the offset frequency.

32. The one or more computer-readable media of claim 26, wherein the one or more RF modules include a local oscillator, and wherein the processing of the received plurality of GNSS signals to the down-converted signal is done in part by the local oscillator with a frequency equal to the first GNSS signal.

33. The one or more computer-readable media of claim 26, wherein the offset frequency is one-quarter of the first channel.

34. The one or more computer-readable media of claim 26, wherein the offset frequency is three-quarters of the first channel.

35. The one or more computer-readable media of claim 26, wherein the offset frequency is one-eighth of the first channel.

36. The one or more computer-readable media of claim 26, where N is an integer and Channel_Spacing is a channel spacing associated with the first channel, and wherein the offset frequency is:

$$\text{Offset frequency}=(\tfrac{1}{4}+\tfrac{1}{2})*\text{Channel\_Spacing}.$$

37. The one or more computer-readable media of claim 26, wherein the offset frequency is a fractional offset of a multiple of a half channel associated with the first channel.

38. An apparatus for isolating a first GNSS signal from a plurality of GNSS signals, the apparatus comprising:
  means for receiving the plurality of GNSS signals, wherein the plurality of GNSS signals include the first GNSS signal;
  means for processing the received plurality of GNSS signals to a down-converted signal, wherein the down-converted signal has a lower frequency than the first GNSS signal, and wherein the down-converted signal includes a first channel associated with a non-zero frequency;
  means for processing the down-converted signal to offset the first channel by an offset frequency corresponding to a fraction of the first channel to create an offset down-converted signal; and means for determining the first GNSS signal from the offset down-converted signal based on the offset frequency.

39. The apparatus of claim 38, wherein the determining further comprises:
means for de-spreading the offset down-converted signal, wherein the offset down-converted signal includes an aliased signal associated with the first channel; and
means for rejecting the aliased signal by filtering out the aliased signal based on the offset frequency.

40. The apparatus of claim 39, wherein the first channel is a positive frequency, and wherein the down-converted signal is centered at or near zero Hertz and the down-converted signal further includes a second channel associated with a negative frequency, and wherein offsetting the first channel results in a center of the first channel being offset from a center of the second channel.

41. The apparatus of claim 40, wherein the center of the aliased signal associated with the first channel and the center of a second GNSS signal associated with the second channel are offset based on the offset frequency.

42. The apparatus of claim 39, wherein the first channel is a negative frequency, and wherein the down-converted signal is centered at or near zero Hertz and the down-converted signal further includes a second channel associated with a positive frequency, and wherein offsetting the first channel results in the center of the first channel being offset from the center of the second channel.

43. The apparatus of claim 42, wherein the center of the aliased signal associated with the first channel and the center of a second GNSS signal associated with the second channel are offset based on the offset frequency.

44. The apparatus of claim 38, wherein the processing of the received plurality of GNSS signals to the down-converted signal is done in part by a means for generating a frequency equal to the first GNSS signal.

45. The apparatus of claim 38, wherein the offset frequency is one-quarter of the first channel.

46. The apparatus of claim 38, wherein the offset frequency is three-quarters of the first channel.

47. The apparatus of claim 38, wherein the offset frequency is one-eighth of the first channel.

48. The apparatus of claim 38, where N is an integer and Channel_Spacing is a channel spacing associated with the first channel, and wherein the offset frequency is:

Offset frequency=($\frac{1}{4}$+N*$\frac{1}{2}$)*Channel _Spacing.

49. The apparatus of claim 38, wherein the offset frequency is a fractional offset of a multiple of a half channel associated with the first channel.

* * * * *